United States Patent [19]

Tsuchihasi et al.

[11] Patent Number: 4,620,830
[45] Date of Patent: Nov. 4, 1986

[54] JOINT TYPE ROBOT

[75] Inventors: Akira Tsuchihasi, Nagareyama; Ichirou Takahashi, Narashino; Norihisa Miyake, Chiyodamura, all of Japan

[73] Assignee: Hitachi, Ltd., Tokyo, Japan

[21] Appl. No.: 546,578

[22] Filed: Oct. 28, 1983

[30] Foreign Application Priority Data

Oct. 29, 1982 [JP] Japan ................................ 57-189031
Oct. 29, 1982 [JP] Japan ................................ 57-189030

[51] Int. Cl.⁴ .............................................. B25J 9/00
[52] U.S. Cl. ...................................... 414/735; 74/640; 414/744 R; 901/21; 901/23; 901/28; 901/48
[58] Field of Search ........... 414/735, 719, 730, 744 R, 414/687; 901/15, 22, 23, 25, 26, 21, 27, 28, 48; 74/640, 665 A, 665 C

[56] References Cited

U.S. PATENT DOCUMENTS 2,802,585  8/1957  Morin ................................. 414/735
3,790,002  2/1974  Germond et al. .................. 901/15 X
4,275,986  6/1981  Engelberger et al. ............. 414/730
4,396,344  8/1983  Sugimoto et al. .................. 414/735
4,501,522  2/1985  Causer et al. ..................... 901/25 X

OTHER PUBLICATIONS

Industrial Robots: Getting Smarter all the Time; Merritt, Rich; Instruments & Control Systems; Jul. 1982.

Primary Examiner—Robert J. Spar
Assistant Examiner—Donald W. Underwood
Attorney, Agent, or Firm—Beall Law Offices

[57] ABSTRACT

A joint type robot comprises a fixed bed, a swivel base on the fixed bed, a motor base on the swivel base, an upper arm capable of elevating on the motor base, a front arm capable of elevating at the tip of the upper arm, a wrist at the tip of the front arm, and so forth. The upper arm extends rearward beyond the center axis of rotation of its elevating motion. The rearwardly extending portion can enter a notch of the motor base. A driving motor for turning the swivel base is disposed at a position deviated from the center axis of rotation and in parallel with the center axis of rotation. The pair of driving motors for the upper and front arms are mounted on the motor base parallel to each other yet oriented in opposite directions to keep the robot as small as possible. The wrist driving motors are mounted on the upper arm in similar fashion. All the features of the robot are designed to keep the robot as small and as light as possible.

5 Claims, 39 Drawing Figures

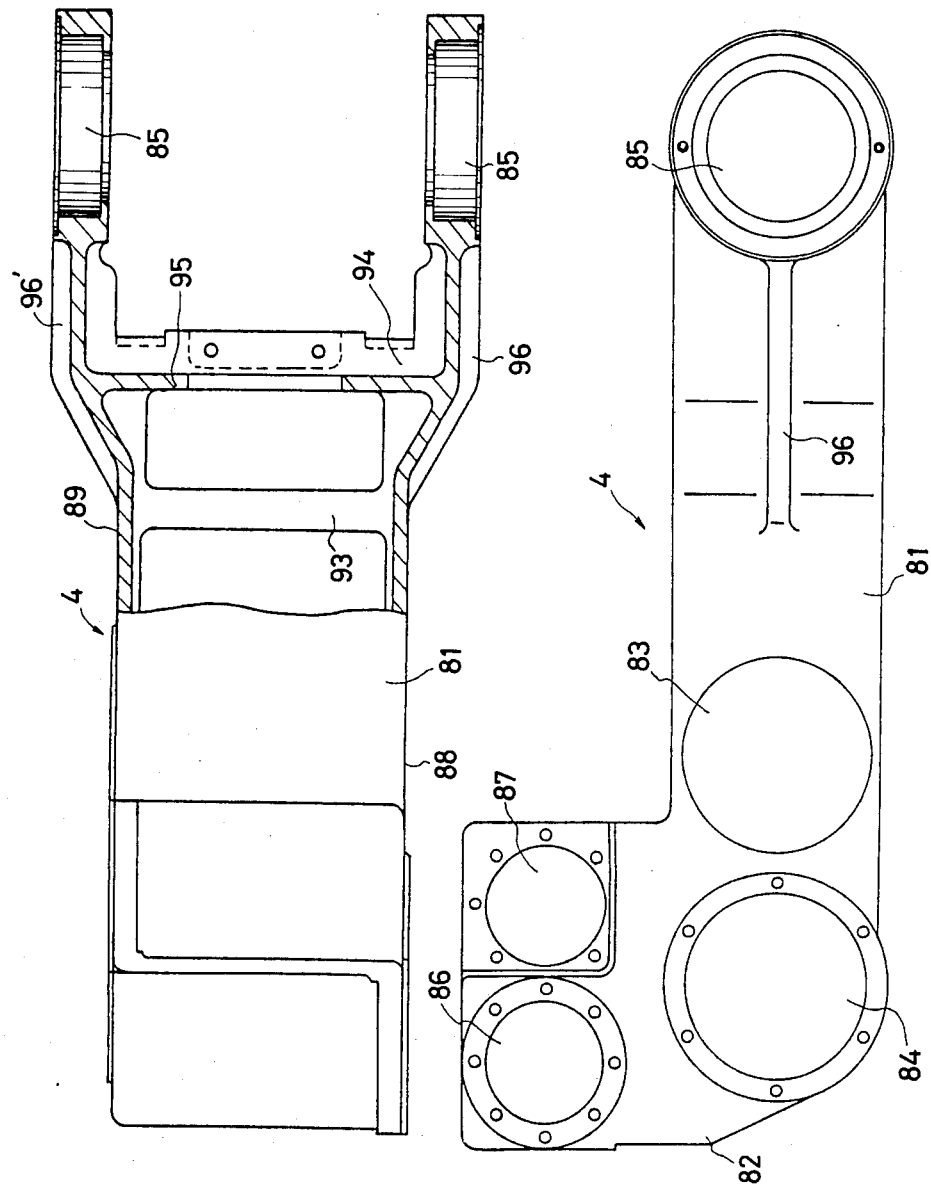

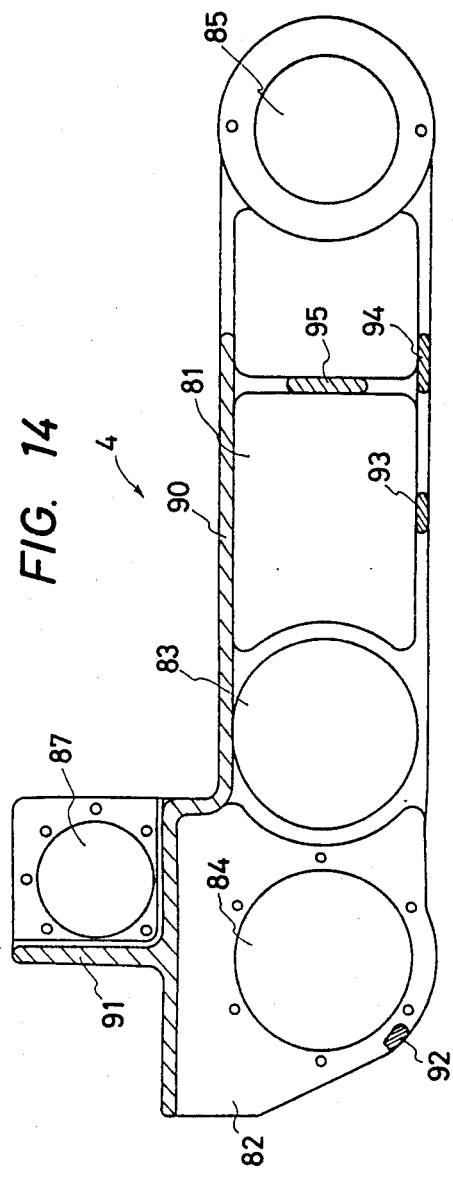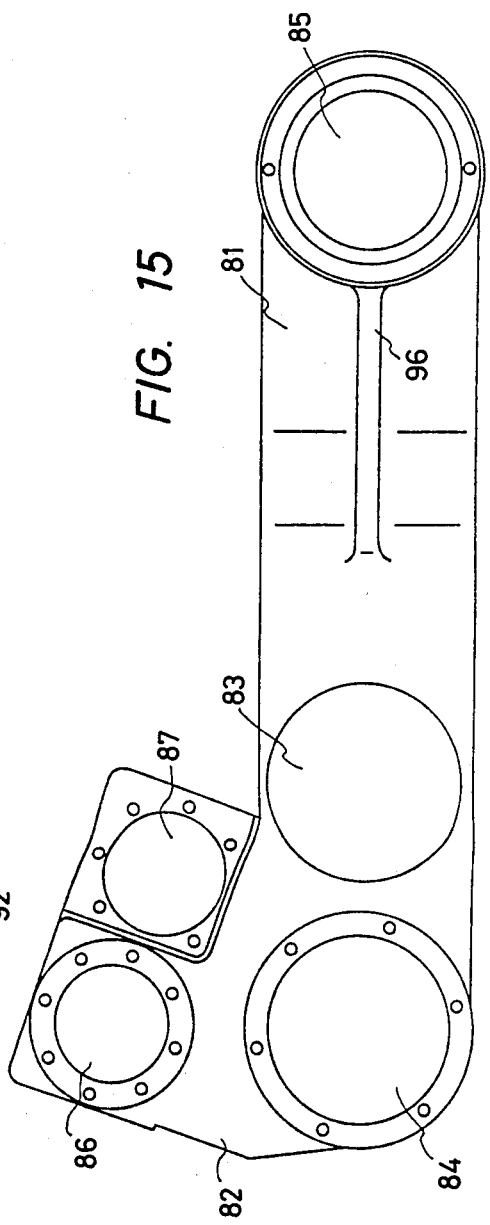

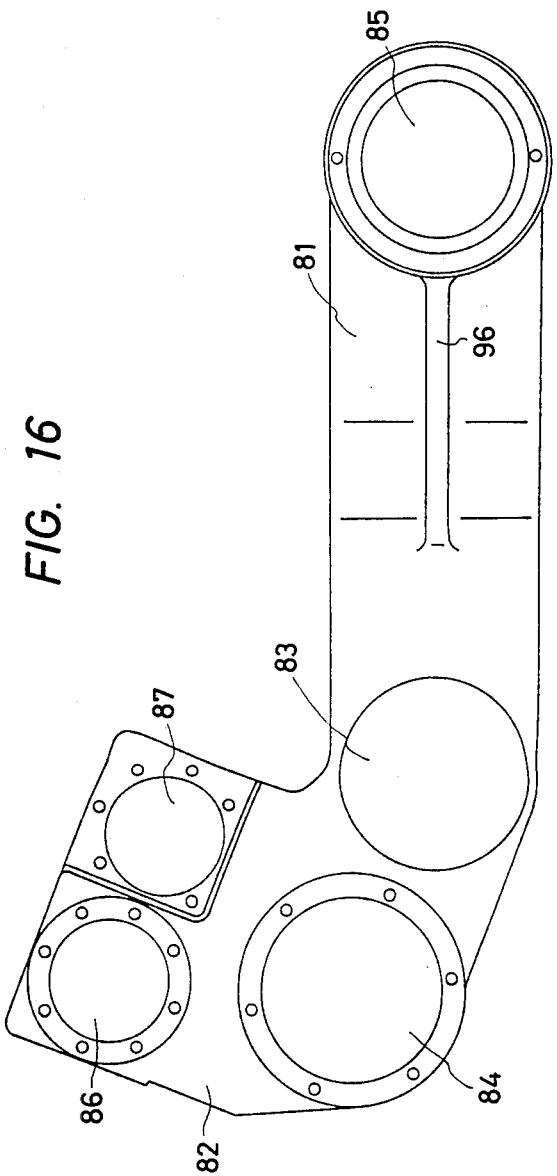

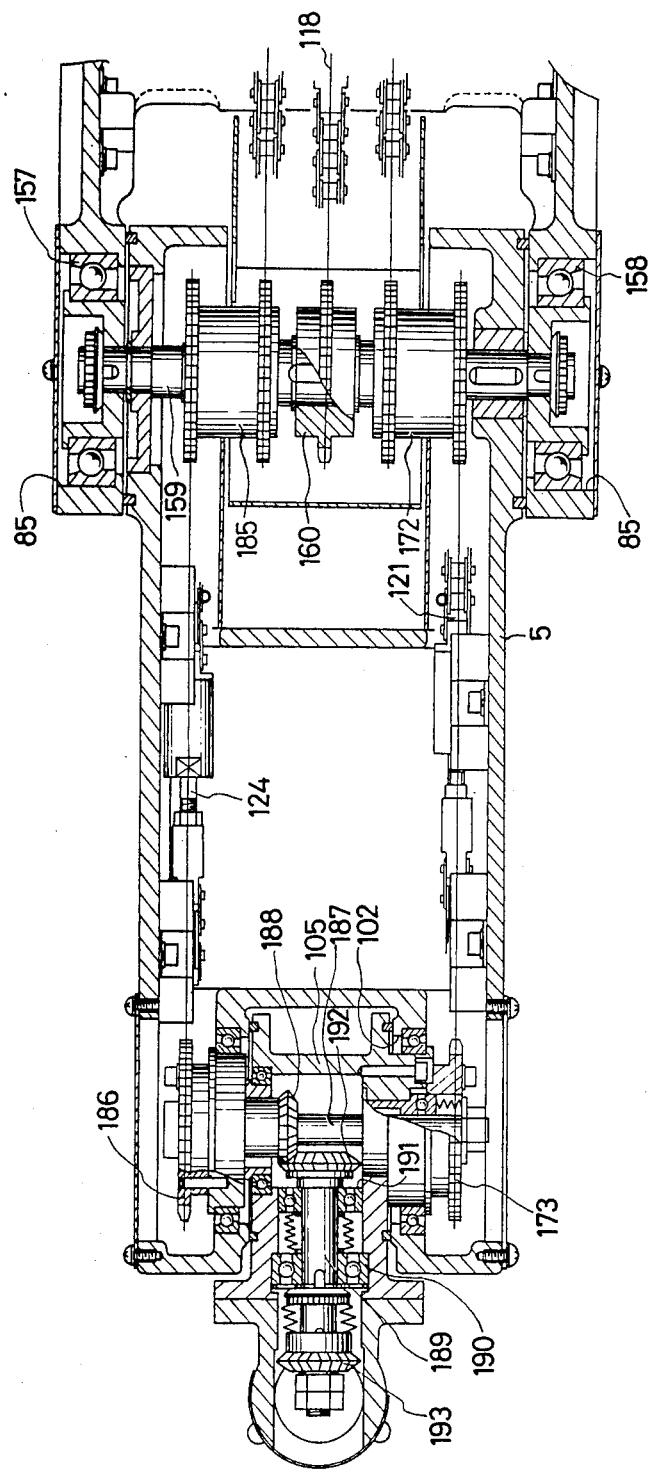
FIG. 31-a

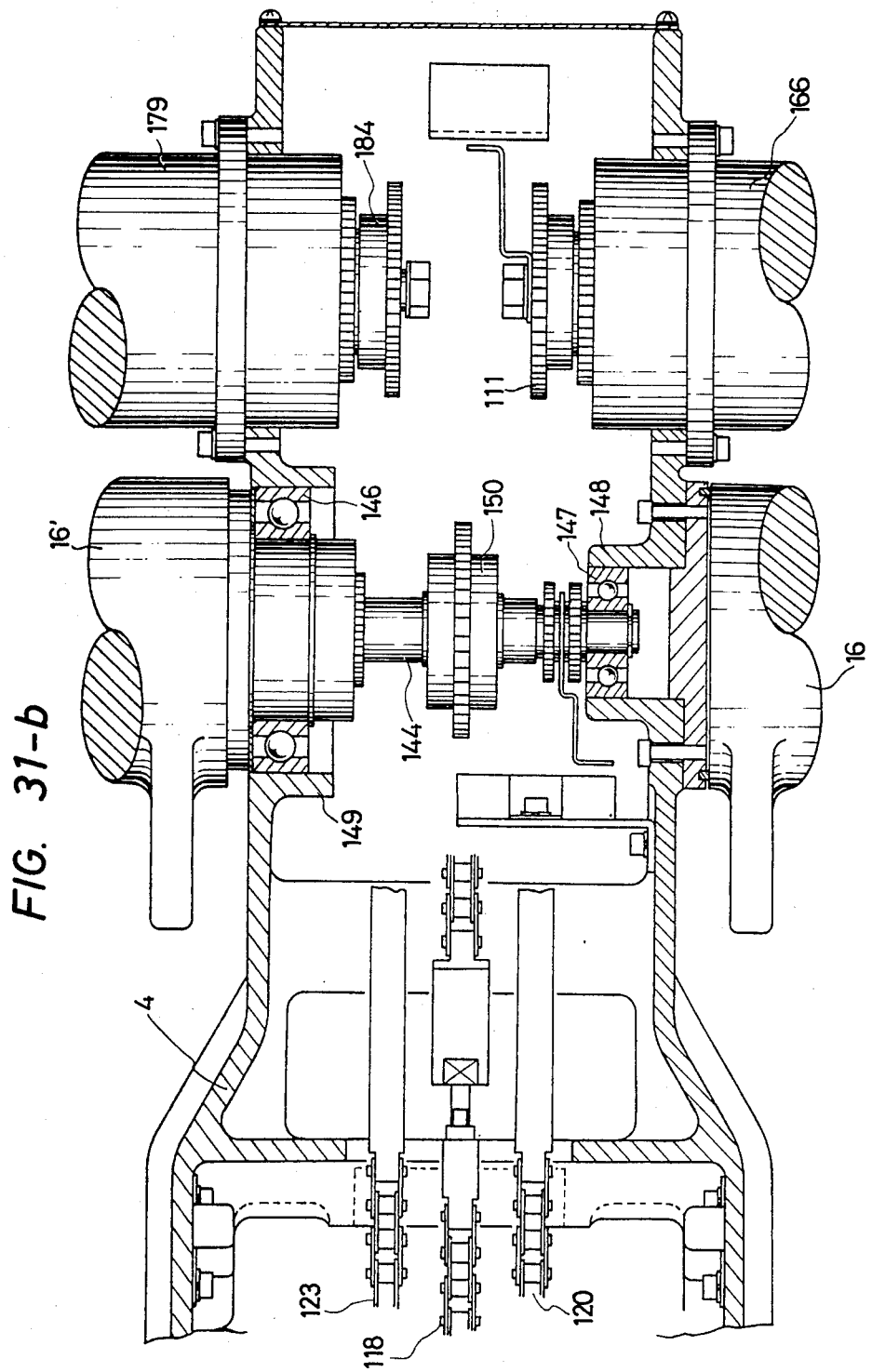

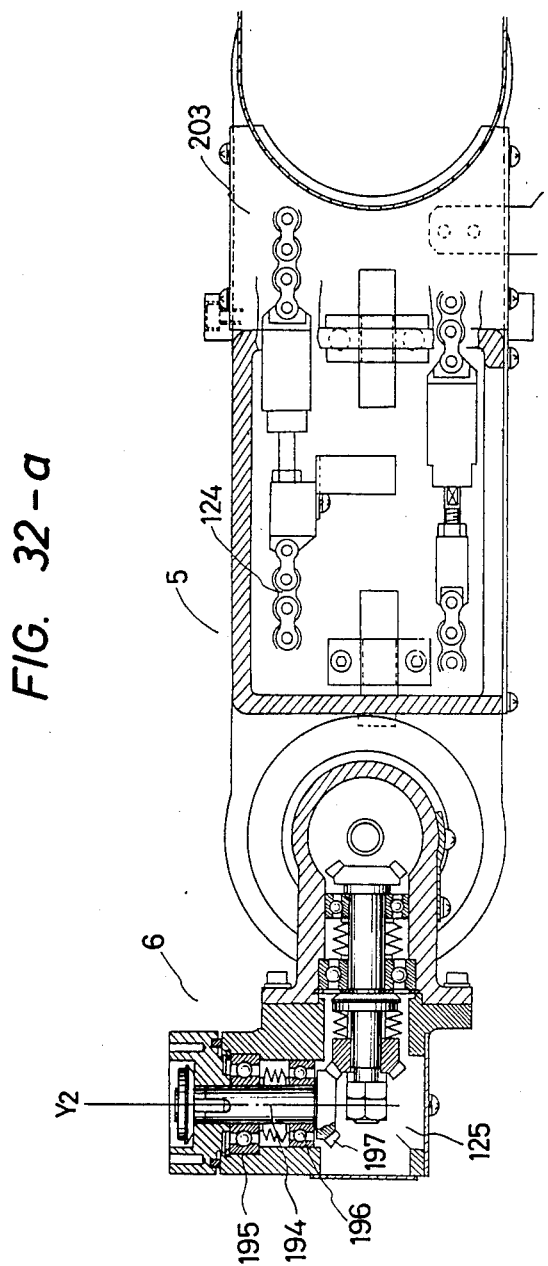
FIG. 32-a

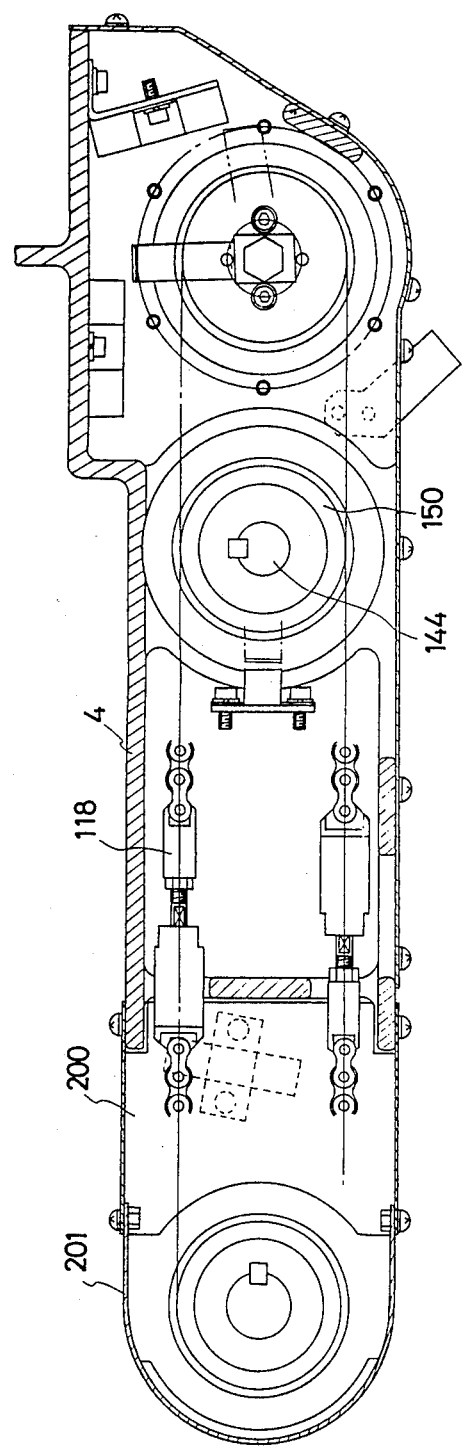
FIG. 32-b

JOINT TYPE ROBOT

BACKGROUND OF THE INVENTION

This invention relates to an industrial robot and more particularly, to a portable joint type robot for use in welding large scale structures and the like.

Development of industrial robots has made a remarkable progress in recent years and an extremely wide variety of robots have been announced. These robots can be classified structurally into a rectangular coordinate type robot, a cylindrical coordinate type robot, a polar coordinate type robot and a joint type robot. The robots of these types have their respective features and have been used in fields corresponding to the features. Among them, the joint type robot having high freedom has recently drawn an increasing attention because it can secure a greater operation range with respect to the installation area than the others.

In any way, most of the industrial robots of the kind described above are of the fixed installation type and weigh from one to several hundreds of kilograms. Hence, they can not easily be moved from one installation position to another. Although a robot having the main body weight of as small as about 10 kg has been developed at present, it is not suitable for welding or the like because a maximum portable weight is up to 1 kg. In other words, a tool to be held by a small robot is substantially the same as that of a large robot and hence, a conventional portable robot using small motors and reduction gears has so low capacity that it can not operate while holding a tool that is generally used by a skilled laborer, and high speed high acceleration operation can never be expected. If a large wrist driving motor is used in order to increase the portable weight of the robot, however, the main body construction becomes larger in scale and if this problem is to be avoided, the operation region of a small robot must be drastically reduced due to the limitation of these driving devices.

To reduce the size and weight, the design of such a small robot is difficult and the arrangement of each constituent member is also difficult. Accordingly, the robot performance is sometimes sacrificed to design the small robot.

SUMMARY OF THE INVENTION

It is therefore an object of the present invention to provide a multi-joint type portable robot which is small in size and light in weight and yet has a portable capacity of from 2 to 3 kg.

The present invention is particularly directed to provide a joint type robot which eliminates the design disadvantages such as the arrangement of constituent members resulting from the reduction of the size of the robot as a whole, which is compact and simple in construction and yet has a wide operation region.

To accomplish the objects described above, the joint type robot in accordance with the present invention comprises a fixed bed capable of being installed at a desired position, a swivel base disposed on the fixed bed so as to be capable of rotating around a vertical first axis of rotation, a motor base fixed onto the swivel base, an upper arm fitted to the motor base so as to be capable of elevating around a horizontal first axis of rotation crossing at right angles the vertical first axis of rotation, a front arm disposed close to the tip of the upper arm so as to be capable of elevating around a horizontal second axis of rotation in parallel with the horizontal first axis of rotation, and a wrist having freedom around at least one axis and disposed close to the tip of the front arm, wherein the upper arm extends rearward beyond the horizontal first axis of rotation as the center of rotation of its elevating motion and a notch having a suitable shape is defined on the motor base so that the rearwardly extending portion of the upper arm enters the notch.

In the present invention, the upper arm extends rearward beyond the horizontal first axis of rotation $X_1$ as the center of rotation of its elevating motion so as to reduce the driving force necessary for elevating an arm mechanism (due to the counter-balance action) and thus to reduce the size of the driving motor. The notch having a suitable shape is formed on the motor base 3 supporting the arm mechanism 20 so that when the front portion of the upper arm 4 on the wrist side rocks upward, its rearwardly extending portion can enter the notch of the motor base 3, eventually enlarging the angle of elevation of the upper arm 4.

In accordance with another feature of the present invention, a driving motor for rotating the swivel base in the joint type robot described above around the vertical first axis of rotation is disposed at a position deviated from the vertical first axis of rotation in parallel with this axis of rotation.

In accordance with still another feature of the present invention, driving motors for elevating the upper and front arms of the joint type robot described above are disposed on the motor base and these motors are arranged parallel to each other but in opposite directions.

In accordance with still another feature of the present invention, driving motors for driving the wrist at each freedom are disposed on the upper arm of the joint type robot described above, and these motors are arranged in parallel with one another but in opposite directions.

More specifically, the joint type robot in accordance with the present invention has the fixed bed which can be moved to a desired position corresponding to a desired work by human power or other particular power means so as to particularly match the welding work of large scale structures and can be suitably installed at the desired position. The robot has the swivel base on the fixed base, the swivel base being disposed so as to be capable of rotating around the vertical first axis of rotation. A rotation driving motor is not incorporated inside the swivel base to minimize the height but is disposed outside, so that the swivel base can be rotated via suitable power transmission means. A motor base, on which driving motors for elevating the upper and front arms are fixed, is fixed to this swivel base by suitable means such as bolts. Accordingly, the motor base rotates together with the swivel base around the vertical first axis of rotation.

The side surface of this motor base has a pointed and bent L-shape (visually L-shape) and the driving motors for the upper and front arms are fitted close to the base portion of the L-shape. The upper arm is turnably supported in the proximity of the pointed portion of the motor base in such a manner as to be capable of elevating around the horizontal first axis of rotation disposed at right angles the vertical first axis of rotation. The side surface of this upper arm has an L-shape whose major axis portion extends in the horizontal direction and is turnably supported around the horizontal first axis of rotation with respect to the pointed portion of the motor base in the proximity of the point of intersection between the major and minor axes portions of the L-shape. Accordingly, the vertical L-shape minor axis portion of the upper arm extends rearwards beyond the motor base. At least one, and preferably two, motors are fixed to the rearwardly extending portion of this upper arm so as to drive the wrist.

The front arm is turnably supported at the tip of the upper arm around a horizontal second axis of rotation which is disposed parallel to the horizontal first axis of rotation. A wrist having at least one freedom is supported at the tip of this front arm. The wrist having two or three freedoms is mostly used, though the wrist having one freedom is sometimes used. As a definite example, the follwing description will deal with the wrist having two freedoms. The wrist is permitted to rotate around a horizontal third axis of rotation (hereinafter referred to as an "axis of pitching motion" or "P axis") and around a vertical second axis of rotation (hereinafter referred to as an "axis of yawing motion" or "$Y_2$ axis") which crosses at right angles the horizontal third axis of rotation. The shape of the bent L-shaped side surface of the motor base described earlier is such that the portion close to the center is notched and when the tip of the upper arm rocks upward, the rearwardly extending portion that rocks downward, on the contrary, enters the notch.

BRIEF DESCRIPTION OF THE DRAWINGS

FIGS. 12 through 14 are detailed views showing the upper arm of the portable joint type robot of the present invention;

FIGS. 15 and 16 are side views showing modified examples of the upper arm shown in FIGS. 12 through 14;

FIGS. 29 through 32B are detailed sectional views of the members and are useful for explaining in detail the power transmission system diagram of FIG. 28;

DESCRIPTION OF THE PREFERRED EMBODIMENTS

Figure 1:
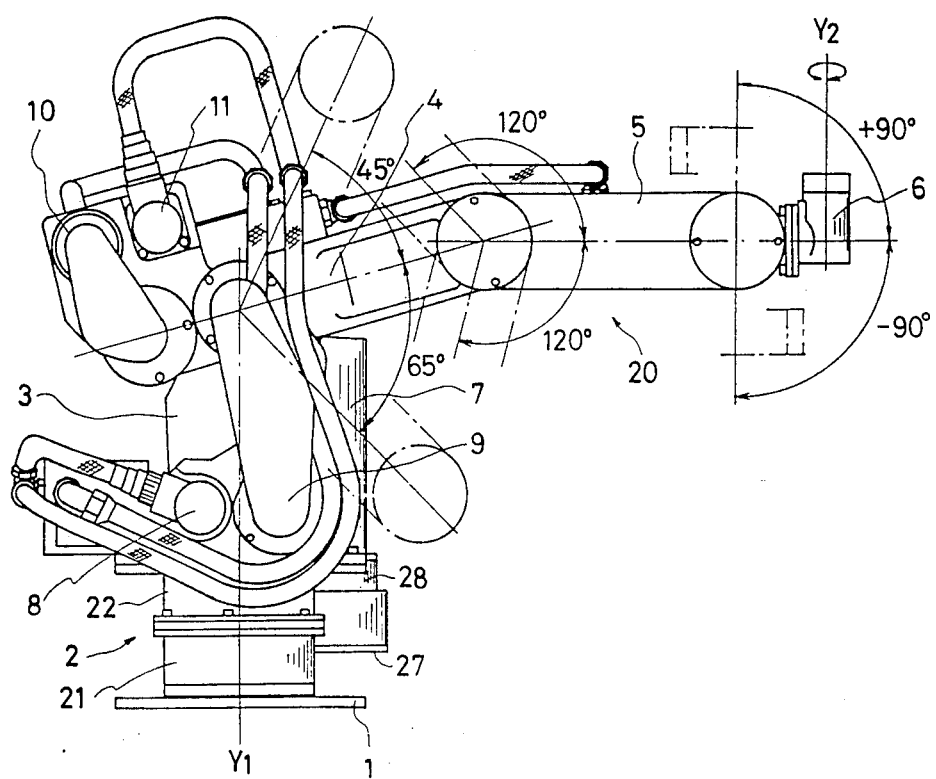
FIGS. 1 through 3 are overall assembly diagrams showing a definite example of the portable joint type robot in accordance with the present invention.

Next, definite embodiments of the present invention will be described in further detail with reference to the accompanying drawings. The present invention will be more clearly understood from the following description, though it is not particularly limited to the embodiments thereof.

First, the overall structure of a joint type robot, especially a portable joint type robot, in accordance with the present invention will be explained. A fixed bed 1 is removably disposed on the floor of a factory or the floor of an object of work. A swivel base 2, which is rotated around a vertical first axis of rotation $Y_1$ by suitable rotation means, is placed on this fixed bed 1. A motor base 3 supporting the laterappearing arm mechanism 20 in such a manner as to be capable of elevation is fixed to the swivel stand 2 by bolts or the like. An upper arm 4 forming the first arm of the arm mechanism 20 is supported in the vicinity of the top of the motor base 3 in such a manner as to be capable of elevation around a horizontal first axis of rotation $X_1$. A front arm 5 forming the second arm of the arm mechanism 20 is supported at the tip of this upper arm 4 in such a manner as to be capable of elevation around a horizontal second axis of rotation $X_2$ which is disposed in parallel with the horizontal first axis of rotation $X_1$. A wrist 6 having two freedoms is supported at the tip of the front arm 5 so that it can accomplish pitching motion around a P axis and yawing motion around a $Y_2$ axis.

The portable robot illustrated in the drawings is of a type which is to be installed on the floor of a factory or the like, but the present invention is not limited in any manner by the method of installation. Accordingly, the robot of the present invention may be disposed on a track running on rails laid down in advance or on a running vehicle that travels on an endless track. In the robots of this running type, however, relative location between the robot and the workpiece becomes naturally an important factor. Among various location means, pin engagement, for example, can make location relatively easily and provides high accuracy. Definite examples of location means are omitted because it is not the subject matter of the present invention.

Figure 2:
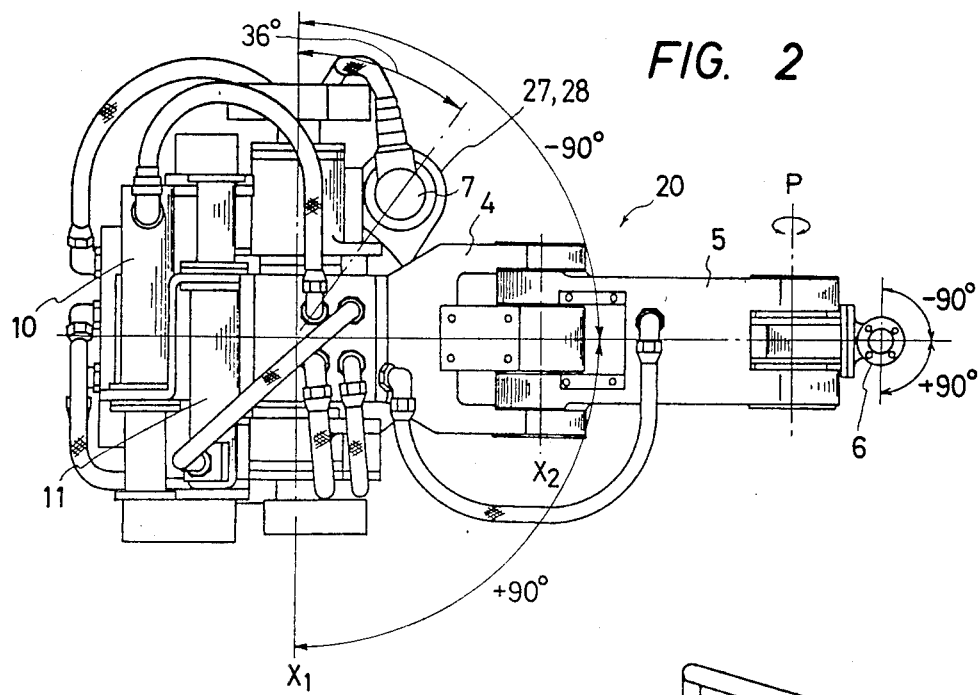
Figure 3:
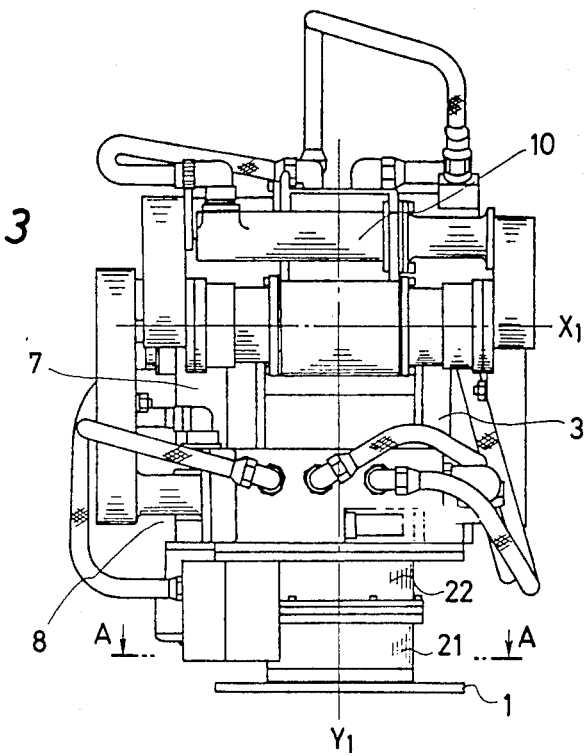
Figure 5:
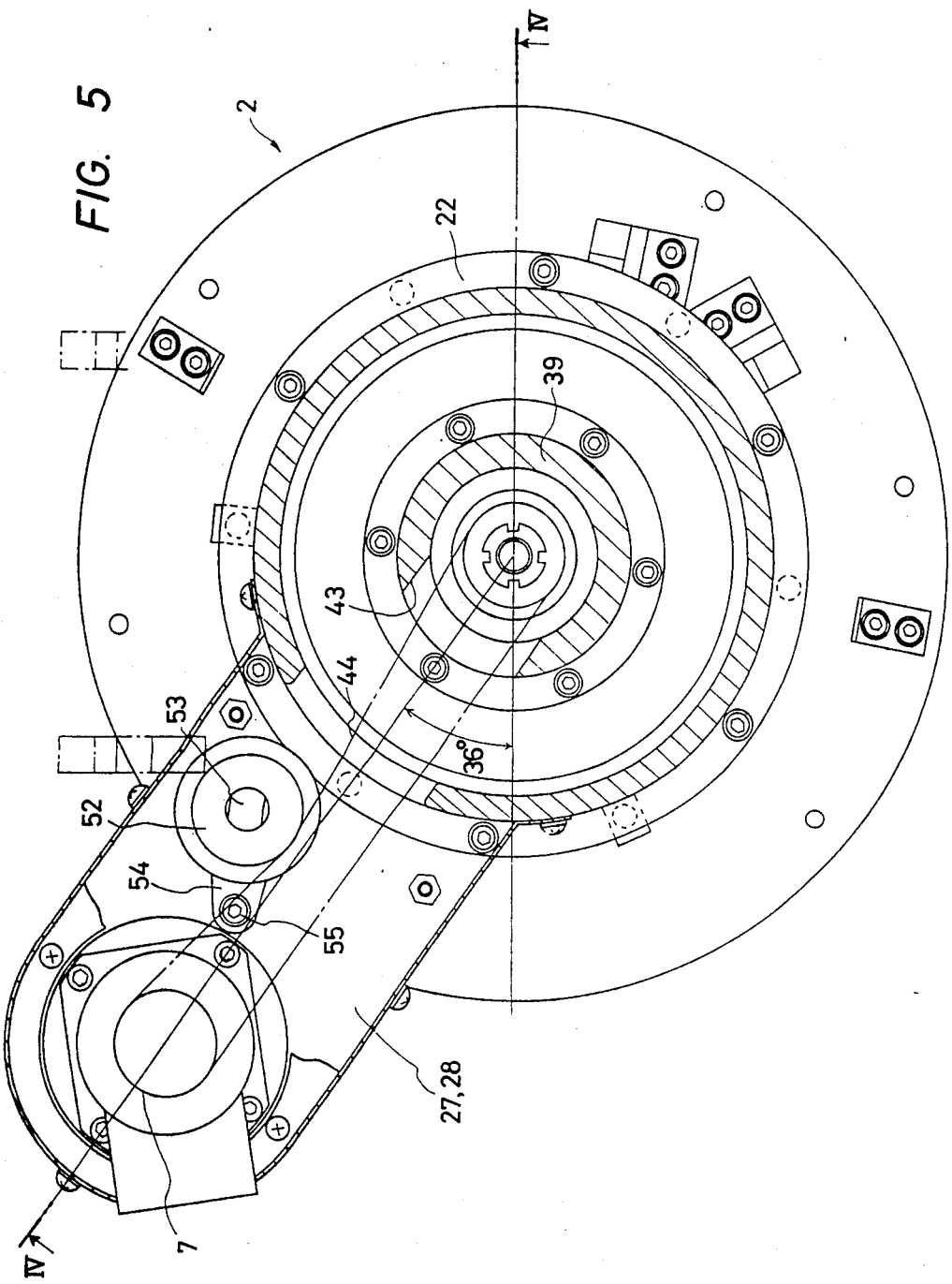
FIG. 5 is a top view with a part of FIG. 4 being exploded.

The description will be continued in further detail with reference to the drawings. The swivel base 2 consists of two portions, i.e., first and second bases, in order to incorporate therein a power transmission mechanism. Motor placing beds 27, 28 for accommodating a motor 7 swell from these two bases. The swelling direction of these bases is set in the direction inclined by 36° from the horizontal first axis of rotation $X_1$ to which the arm mechanism 20 is mounted as shown in FIG. 5. The motor 7 is mounted to the placing beds 27, 28 in the vertical direction. Since the motor 7 is not incorporated inside the base but is disposed thereoutside, the dimension of the swivel base can be reduced. The motor does not provide any obstacle when the arm mechanism executes elevating motion. Motors 8 and 9 for driving the upper arm 4 and the front arm 5, respectively, are fitted in the proximity of the base portion of the base 3 in parallel with each other and in the horizontal state but in the opposite directions. Motors 10 and 11 for driving the wrist 6 are fitted close to the end portion of the rearwardly extend portion of the upper arm 4 in parallel with each other but in the opposite direction. The wrist driving motor 10 accomplishes yawing motion around the $Y_2$ axis and the other wrist driving motor accomplishes pitching motion around the horizontal P axis (see FIG. 2) of the wrist 6.

The swivel base 2 and the swivel mechanism will be described in detail with reference to FIGS. 4 and 5. The swivel base 2 has a substantially cylindrical shape and consists of the first and second bases 21 and 22. More definitely, the first base 21 includes a fixed base 24 which is disposed on the floor or the like by suitable fixing means, and a rotary base 25 which is supported turnably around the vertical first axis of rotation $Y_1$ with respect to the fixed base 24. This rotary base 25 is firmly supported by a ring-like member 26 with respect to the outer race of a bearing 29. The inner race of the bearing 29 is firmly supported by another ring-like member 30 with respect to the fixed base 24. Accordingly, the rotary base 25 can rotate relative to the fixed base 24. The second base 22 is fixed to the rotary base 25 by suitable fixing means such as bolts lest relative motion occurs between them. The motor base placing bed 23 is placed on the upper surface of the second base 22.

The first base 21 defines a hollow portion 31 substantially at its center and a harmonic drive mechanism 32 is disposed inside the hollow portion 31. Since this harmonic drive mechanism 32 is well known heretofore, its detail will not be described, but it consists of a flexible cylindrical reduction gear 33 and oval driving member 34 and driven ring member 35 that are disposed so as to interpose the cylindrical reduction gear 33 between them. The driven ring member 35 is fixed to an intermediate disc 36 disposed between the first and second bases 21 and 22. A through-hole 38 is bored at the center of the intermediate disc 36 in order to insert the driven shaft 37 and the driving member 35 into it. Since the intermediate disc 36 is fixed to the rotary base 25 of the first stand 21 by fixing means such as bolts, it is rotatable around the $Y_1$ axis. A follower shaft support member 39 is fixed so as to correspond to the through-hole 38 of the intermediate disc 36. The support 39 has an upwardly open cup-like shape and supports a follower wheel 40 inside the cup-like portion. The follower wheel 40 is fixed to a driven shaft 37 by a key and the driven shaft 37 is turnably supported inside the support 39 by bearings 41, 42. An opening 43 is bored at a part of the vertical side surface of the support 39 so that a conduction belt 44 (represented by dot-and-chain line in the drawing) spread on the follower wheel 40 passes through the opening. This conduction belt 44 further passes through an opening 45 which is bored on the vertical side surface of the second base 22 and is spread on a driving wheel 46 connected directly to the output shaft 48 of the motor 7. The driving wheel 46 is fixed to the driving shaft 47 by a key and the driving shaft 47 is directly coupled to the output shaft 48 by a coupling 49 and is rotatably supported by bearings 50, 51 inside the motor placing bed 27 swelling from the first base 21. A tension wheel 52 is disposed close to the center of the conduction belt 52 and pushes the belt 44 from outside, thereby generating tension. This tension wheel 52 is turnably supported by a bolt 53, which is fitted through a support plate 54 which is in turn supported in such a manner as to be capable of rocking around a pin 55 within a predetermined angle.

An arcuate hole (not shown) is formed inside the motor placing bed 27 swelling from the first base 21 so as to accept the bolt 53. When the tension wheel 52 generates suitable tension acting upon the conduction belt 44, it fastens the bolt 53 and lets predetermined tension always act upon the conduction belt 44. Guide discs 56, 56 are disposed at the upper and lower portions of the tension wheel 52 to prevent the fall-off of the conduction belt 44 and a bearing 57 is disposed at the center. Though not shown, teeth are shaped on the inner surface of the conduction belt 44 to ensure conduction and corresponding teeth are formed on each of the follower wheel 40, driving wheel 46, and tension wheel 52.

As described above, the motor 7 is placed on the swivel motor placing beds 27, 28 that are deviated from the vertical first axis of rotation $Y_1$ as the center axis of rotation of the swivel base 2. This arrangement can reduce the dimension of the swivel base 2, especially its height. The outer circumferential portions of the motor placing beds 27, 28 swelling from the swivel base 2 are covered with a substantially U-shaped cover 58 while its upper surface is covered with a flat sheet-like cover 59.

Next, the relation of arrangement of the driving motors 8, 9 for letting the upper and front arms 5 elevate and the driving motors 10, 11 for letting the yawing and pitching motions of the wrist 5 will be described in detail.

The driving motors 8, 9 for letting the upper and front arms 4, 5 elevate are disposed in the proximity of the base portion of the motor base 3 in parallel with each other but in the opposite direction. As illustrated particularly clearly in FIG. 7, transmission of the elevating motion of the upper arm 4 is transmitted as the force of rotation is transmitted from the driving wheel 61 connected to the output shaft of the driving motor 8, which is disposed horizontally, to the follower wheel 63 by the conduction belt 62. The follower wheel 63 is fixed to the pivot of the upper arm 4 via the harmonic drive mechanism (whose detail will be described elsewhere), thereby accomplishing the elevating motion of the upper arm 4. A tension wheel 65, which is turnably supported by a bolt 66 with respect to a T-shaped support plate 64, applies tension to the conduction belt 62. The tension wheel 65 consists of a bearing and two guide discs in the same way as the tension wheel 52 described earlier. To apply tension to this belt 62, the lateral plates of the T-shaped support plate 64 are supported by two bolts 67, 68 so that bolt 67 acts as the center of the rocking pivot of the T-shaped support plate 64 while bolt 68 firmly fixes the T-shaped support plate 64 at a suitable position of an arcuate hole 69.

The power transmission mechanism of the elevating motion of the upper arm 4 described above has substantially the same construction as the power transmission mechanism of the rotating motion of the swivel base 2 described already.

Figure 6:
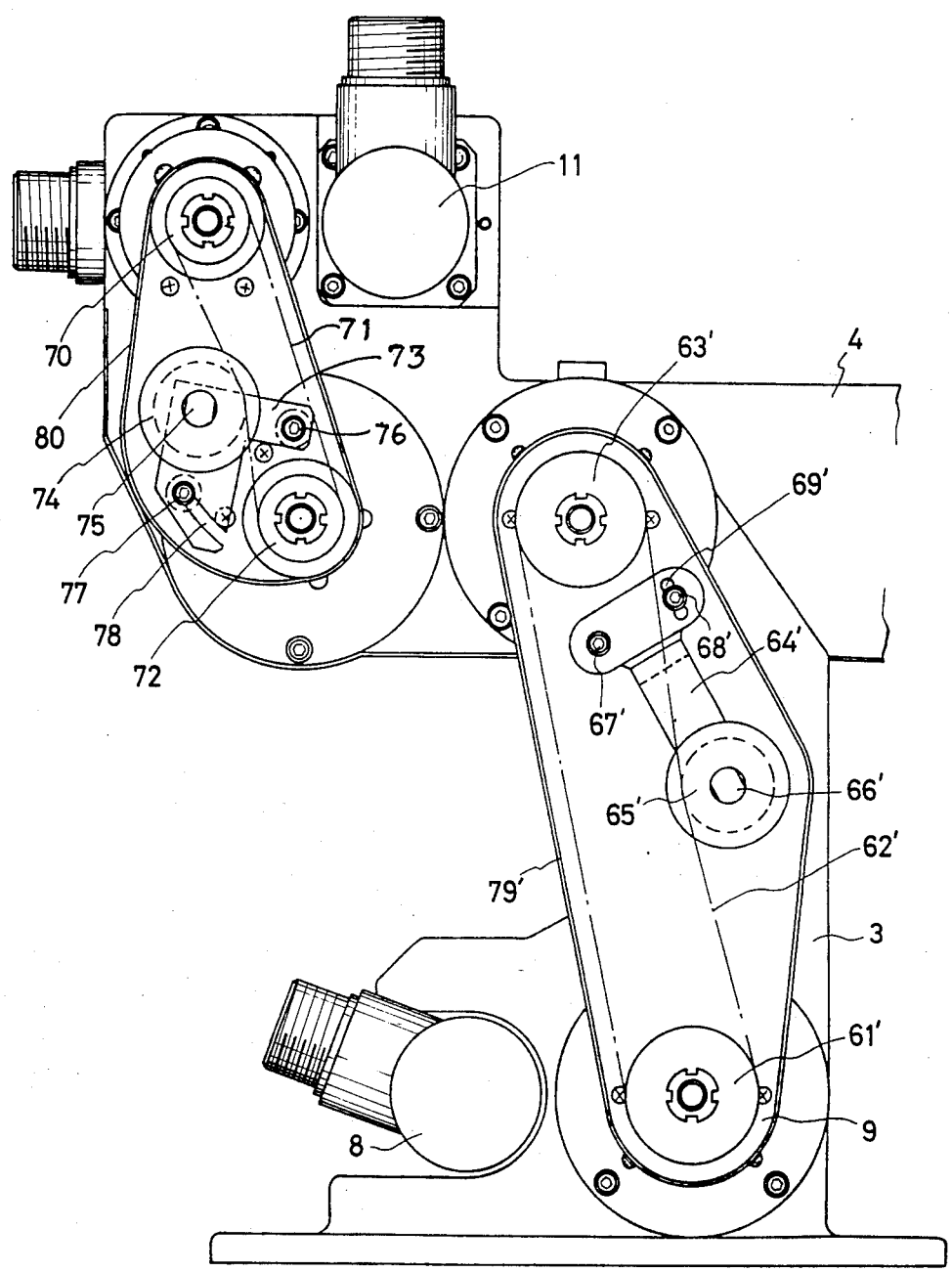
FIGS. 6 through 8 are partial enlarged views showing the disposition and power transmission mechanisms of driving motors, respectively.

On the other hand, transmission of the elevating motion of the front arm 5 is illustrated particularly clearly in FIG. 6. Since this power transmission mechanism is analogous to that of the upper arm 4, the members having the same functions are represented by putting dashes to the same reference numerals used for the mechanism of the upper arm 4.

Transmission of the elevating motion of the front arm 5 is accomplished as the force of rotation is transmitted from the driving wheel 61' connected to the output shaft of the driving motor 9, which is disposed horizontally, to the follower wheel 63' by the conduction belt 62'. The follower wheel 63' rotates a sprocket which is coaxial with the pivot of the upper arm 4 via the harmonic drive mechanism, and is fixed to the pivot of the front arm 5 via the chain, thus accomplishing the elevating motion of the front arm 5 (as will be described in further detail later). A tension wheel 65', which is turnably supported by a bolt 66' with respect to a T-shaped support plate 64', applies tension to this conduction belt 62'. In the same way as the tension wheel 52' described already, this tension wheel 65' consists of a bearing and two guide discs. To apply tension to this belt 62', the lateral plates of the T-shaped support plate 64' are supported by two bolts 67', 68' so that one 67' serves as the center of the rocking pivot of the T-shaped support plate 64' while the other 68' firmly fixes the T-shaped support plate 64' at a suitable position of an arcuate hole 69'.

The power transmission mechanism of the elevating motion of the front arm 5 described hereby has substantially the same construction as the power transmission mechanism of the rotary motion of the swivel base 2 and elevating motion of the upper arm 4 described already.

Driving motors 10 and 11 for accomplishing the yawing motion of the wrist 6 around the Y₂ axis and its pitching motion around the P axis are disposed close to the root portion of the upper arm 4 having a substantially L-shaped side surface and their arrangement is substantially the same as the arrangement of the driving motors 8 and 9 for driving the upper arm and front arm, respectively. In other words, these wrist driving motors 10 and 11 are disposed in parallel with each other, horizontally but in the opposite direction. This state can be best seen from FIG. 8. Transmission of the yawing motion of the wrist 6 around the Y₂ axis is accomplished as the force of rotation is transmitted from the driving wheel 70 connected to the output shaft of the driving motor 10 to the follower wheel 72 by the conduction belt 71. The yawing motion is transmitted from the follower wheel 72 to the wrist 6 via the harmonic drive mechanism and via chains rotating inside the upper and front arms 4, 5 (the detail will be described elsewhere). A tension wheel 74 supported rotatably by a bolt 75 with respect to an L-shaped support plate 73 applies tension to the conduction belt 71. This tension wheel 74 consists of a bearing and two guide discs in the same way as described earlier. To apply tension to this belt 71, one end of the L-shaped support plate 73 is used as the center axis of rocking by means of a pivot bolt 76 while the other end is firmly fixed by a bolt 77 that passes through an arcuate slit 78.

Figure 7:
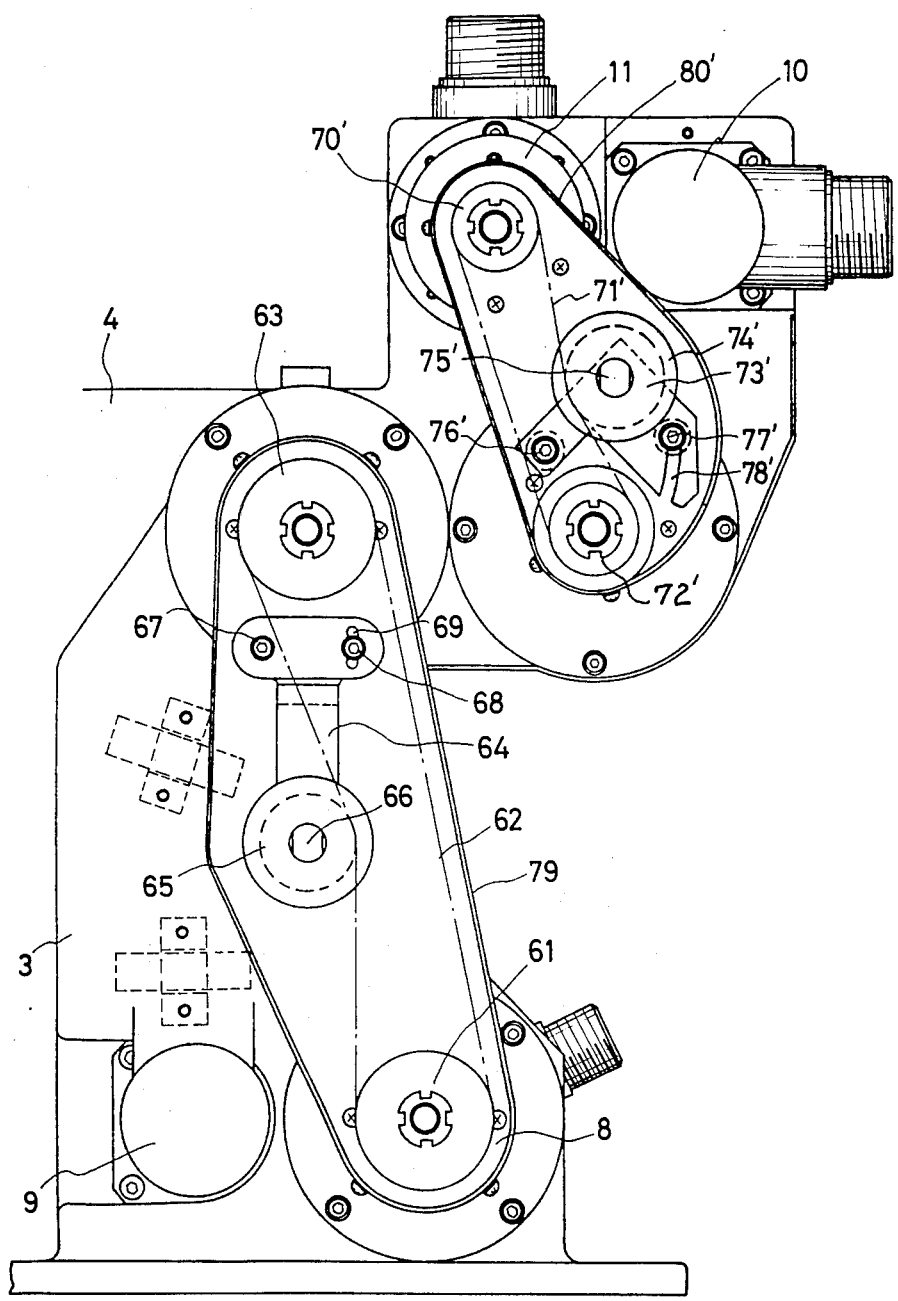

The power transmission mechanism from the driving motor 11 of the pitching motion of the wrist 6 around the P axis is illustrated particularly clearly in FIG. 7. Since this power transmission mechanism is analogous to the power transmission mechanism of the driving motor 10 of the yawing motion of the wrist, like reference numerals with dashes are used to identify those members having the same function. Transmission of the pitching motion of the wrist 6 is effected as the force of rotation is transmitted from the driving wheel 70' connected to the output shaft of the driving motor 11 to the follower wheel 72 by the conduction belt 71'. The pitching motion is transmitted from the follower wheel 72' to the wrist 6 by chains rotating inside the upper and front arms 4, 5 via the harmonic drive mechanism (the detail will be later described). A tension wheel 74' supported rotatably by a bolt 75' with respect to an L-shaped support plate 73' applies tension to the conduction belt 71'. This tension wheel 74' consists of a bearing and two guide discs in the same way as the tension wheel described already. To apply tension to this belt 71', one end of the L-shaped support plate 73' is used as the center axis of rocking while the other end is firmly fixed at a suitable position by a belt 77' that passes through an arcuate slit 78'.

The power transmission mechanism for the yawing motion of the wrist 6 around the Y₂ axis and for its pitching motion around the P axis has substantially the same construction as the power transmission mechanisms of the rotating motion of the swivel base 2 and the elevating motion of the upper and front arms 4 and 5.

Figure 8:
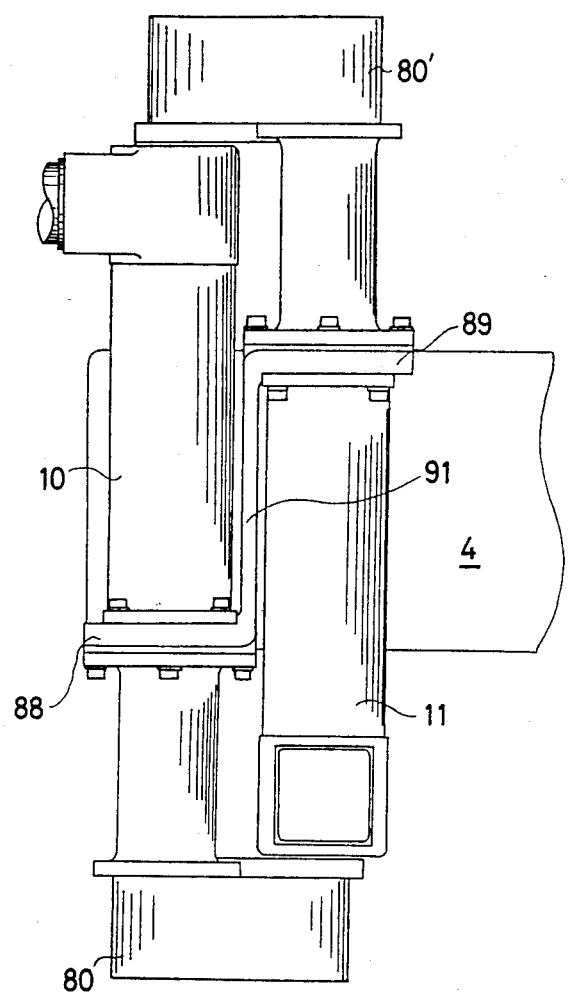

FIG. 8 illustrate the disposition of these driving motors in an easily comprehensive manner. Though this drawing shows the relation of disposition of the two wrist driving motors 10, 11, the relation of disposition of the driving motors 8, 9 for driving the upper and front arms is not particularly shown because this is substantially the same as the former. Motors 10, 11 as well as motors 8, 9 have an output shaft end 48 similar to motor 7 shown in FIG. 4. The axis of rotation of the output shaft is coincident with the longitudinal axis of the respective motor housings. In other words, the driving motors 10 and 11 for the yawing motion and pitching motion of the wrist 6 are disposed in parallel with each other with respect to wrist driving motor fitting plates 88, 89, 91 (whose detail will be described elsewhere) that have a step-like shape as viewed from the upper surface formed close to the root portion of the upper arm 4. Moreover, they are disposed in the opposite direction and horizontally.

The virtual portions of the power transmission mechanisms of these driving motors 8, 9, 10 and 11 are covered with covers 79, 79', 80, 80' having suitable shapes.

Figure 10:
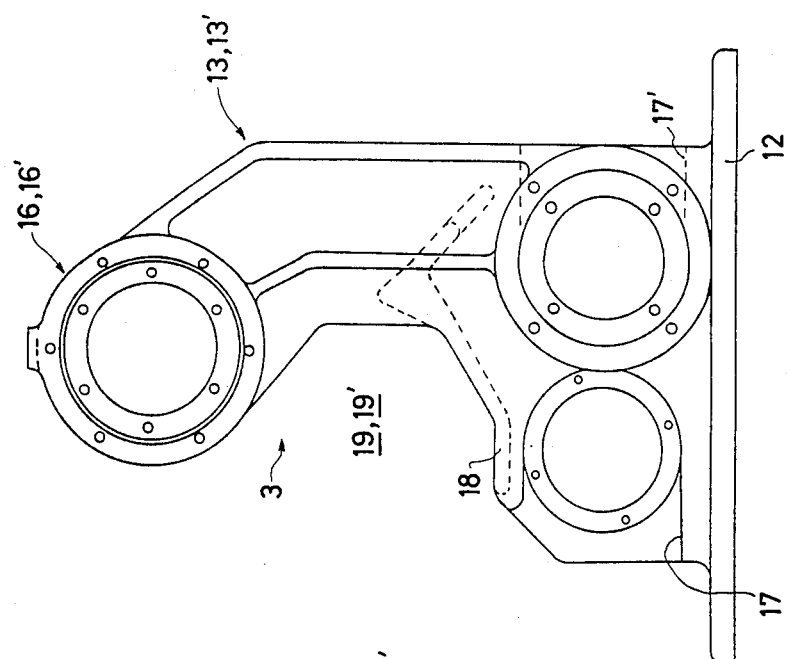
FIGS. 9 through 11 are detailed views of the motor base of the portable joint type robot in accordance with the present invention.
Figure 9:
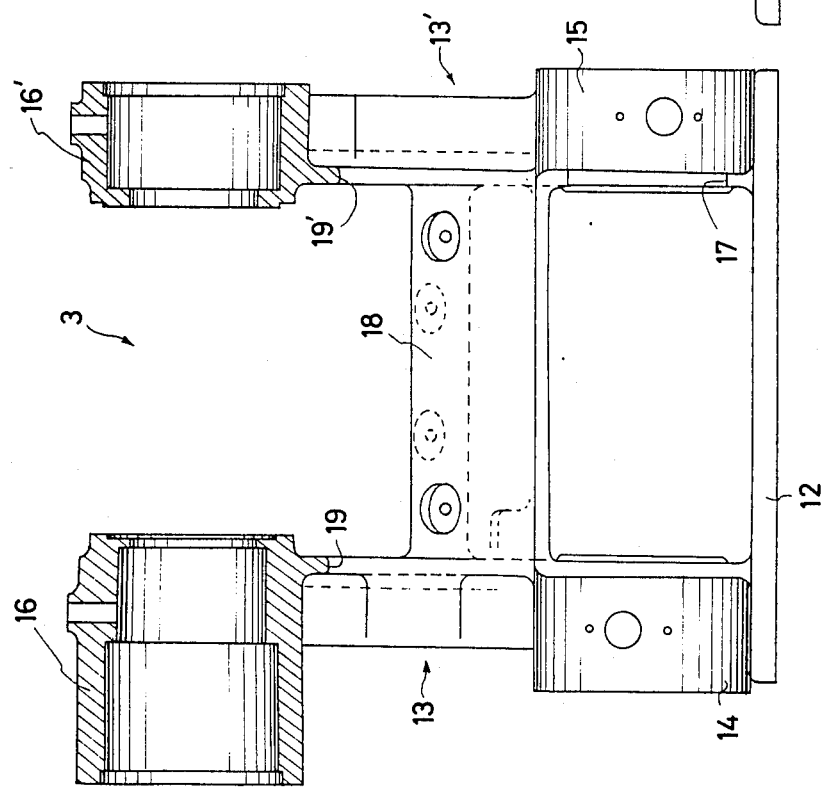
Figure 11:
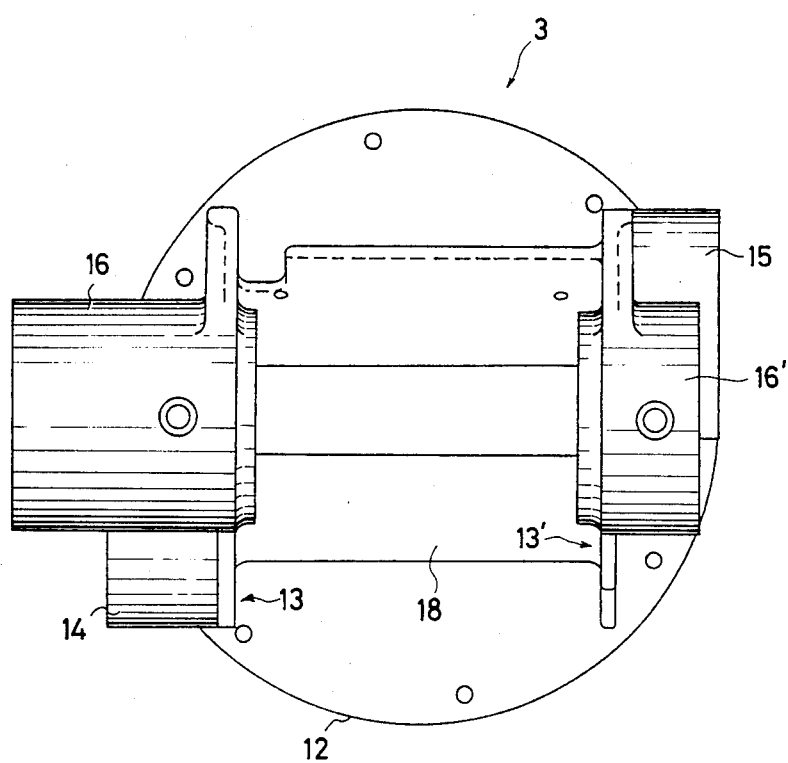

Next, the construction in detail of the motor base 3 will be described with reference to FIGS. 9 to 11. The motor base 3 consists of a casting having a unitary structure as a whole and a motor base disc 12 having a disc-like shape is formed on its base end surface so as to correspond to the motor base placing bed 23 that is formed on the upper surface of the swivel base 2. A pair of upright side walls 13, 13' are disposed so as to extend from this motor base disc 12 and to oppose each other, and a boss 14 for fitting the upper arm driving motor and a boss 15 for fitting the front arm driving motor are formed close to the base end portions of these side walls 13, 13', respectively. The upper end portions on the side walls 13, 13' are pointed, where bosses 16, 16' for supporting the elevation shaft of the upper arm 4 (not shown in FIGS. 9–11; a support shaft around the horizontal first axis of rotation $X_1$), respectively. The driving motors 8, 9 fitted to the motor fitting bosses 14, 15 are longer than the gap between the side walls 13, 13' of the motor base 3, so that U-shaped notches 17, 17' are defined on the side walls 13, 13' on the opposite side to the fitting bosses 14, 15 at positions corresponding to the fitting positions of the driving motors 8, 9 for driving the upper arm and front arm, respectively. The pair of side walls 13, 13' are connected to each other by a reinforcing member 18. As can be seen clearly from the drawings, the side walls 13, 13' have the shape of an odd-shaped hook or an L-shape having a bent top when viewed from their side. In other words, substantially ]-shaped notches 19, 19' are defined at the center of the side walls as can be seen clearly from FIG. 10.

The arm mechanism 20 consisting of the upper arm 4 and the front arm 5 is mounted to this motor base 3. The detailed construction of the upper arm 4 is shown in FIGS. 12 through 16. When viewed from the side, the upper arm 4 has a substantially L-shaped form (see FIG. 13) and is made of a casting of a unitary structure as a whole. The L shape of this upper arm 4 consists of a horizontal extension portion 81 extending horizontally as an elongated shaft portion and an upright base portion 82 extending vertically from the former and serving as a short shaft portion. This upper arm 4 is supported so as to be capable of elevation around the horizontal first axis of rotation $X_1$ with respect to the motor base 3. The upper arm 4 is supported inside an elevation bearing hole 83 formed close to the point of intersection between the horizontal extension portion 81 and the upright base portion 82, though the support structure of the upper arm 4 will be described later in further detail. A follower wheel bearing hole 84 for driving the wrist is formed more rearwards than the elevation bearing hole 83 and a front arm elevation bearing hole 85 is formed at the tip of the horizontal extension portion 81 on the wrist side.

In the embodiment illustrated in FIGS. 12 through 14, these bearing holes are shown disposed with their centers aligned on a line but they need not be disposed in such a manner but may be disposed zigzag (see FIG. 16). As described above, the follower wheel bearing hole 84 for driving the wrist is disposed on the opposite side of the wrist 6 relative to the upper arm elevation bearing hole 83 in order to establish counterbalance against the load acting upon the upper and front arms as well as upon the wrist. However, the arrangement can be selected relatively freely so long as the object described above can be accomplished (see FIGS. 15 and 16).

As can be best seen from FIG. 12, this upper arm 4 has side portions 88, 89 that oppose each other in the longitudinal direction of the upper arm 4 and its width in the transverse direction becomes great at the connecting portion of the side portions with the front arm 5. The bearing holes 83, 84, 85 are formed on the same center line so as to pass through both side portions 88, 89. The side portions 88, 89 are connected to each other and reinforced by an upper surface portion 90, a crossing plate 91 and reinforcing members 92, 93, 94, 95. Reinforcing ribs 96, 96' having a suitable length in the longitudinal direction are formed along the outer side surface of the wide portions of the side portions 88, 89.

Fitting holes 86, 87 for fitting the wrist driving motors 10, 11 are formed on both side surfaces of the upright base portion 82 close to the upper end and these motors 10, 11 are fitted horizontally, in parallel with each other but in the opposite direction. As can be best seen especially from FIG. 14, the half of the upright base portion 82 close to the upper end, where the motor fitting hole is not formed, is cut off. This will be explained with reference to FIG. 13. The fitting hole 86 for the motor 10 is formed on the side surface 88 positioned on the front side of the drawing at the back of the upper end of the upright base portion 82 and the front portion is cut off in the rectangular form. The fitting hole 87 for the motor 11 is formed on the side surface 89 at the depth of the drawing at the front of the upper end of the upright base portion 82 and its rear portion is cut off in the rectangular form. Since a crossing plate 91 connecting both side surfaces 88, 89 is disposed in the proximity of the upper end of the upright base portion 82, the wrist driving motors 10, 11 are disposed while being separated from each other into individual compartments by the crossing plate 91. As described above, both side surfaces 88, 89 of the upright base portion 82 and the connecting crossing plate 91 together form the fitting member of the wrist driving motors 10, 11 and hence, the fitting member has a step-like shape when viewed from above (FIG. 12).

Figure 17:
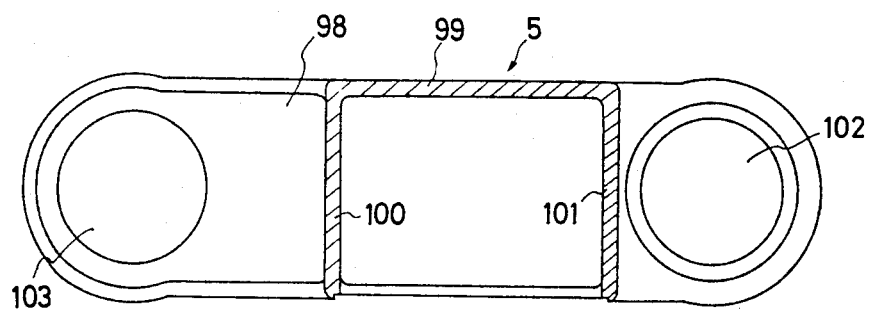
FIGS. 17 and 18 are detailed views showing the front arm of the portable joint type robot of the present invention.
Figure 18:
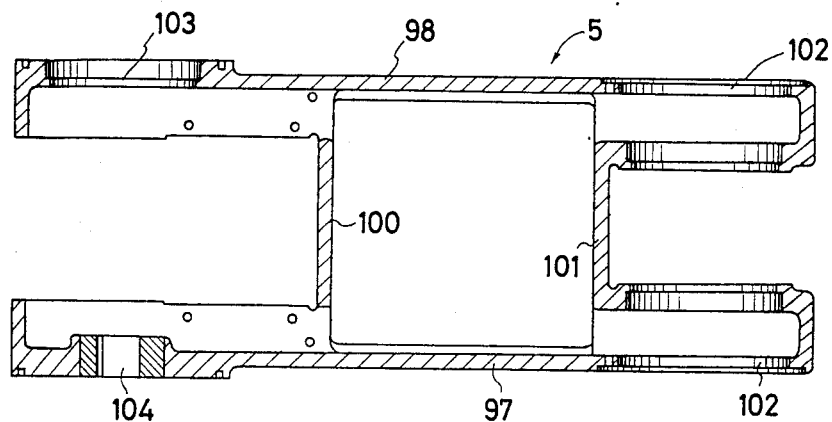
Figure 19:
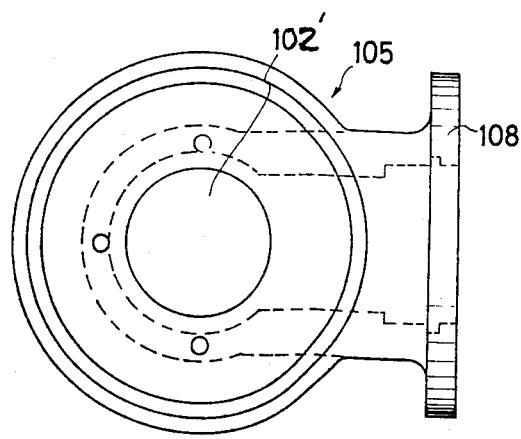
FIGS. 19 through 24 are detailed views of the members forming the wrist of the portable joint type robot of the present invention.
Figure 21:
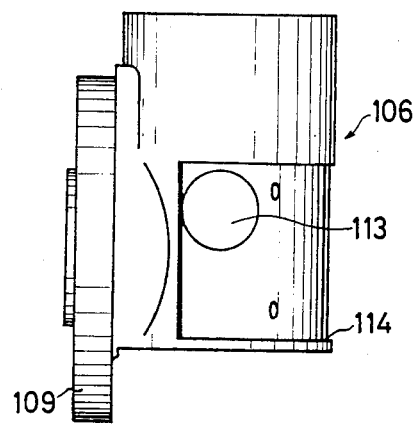
Figure 20:
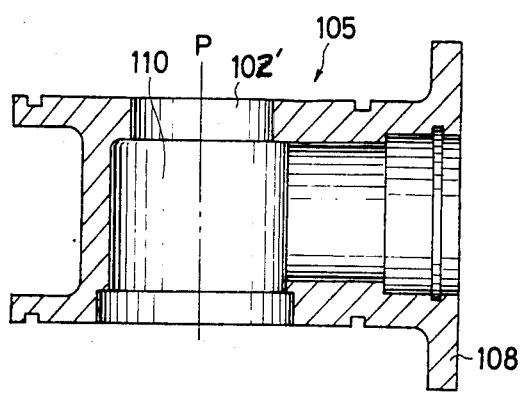
Figure 22:
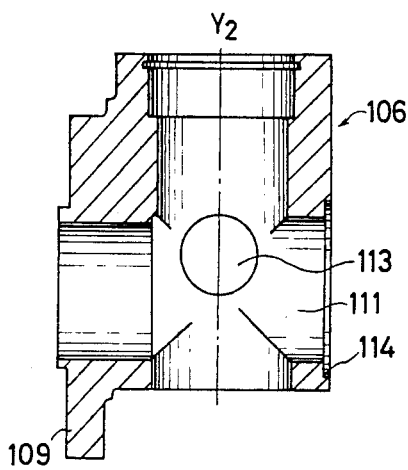
Figure 23:
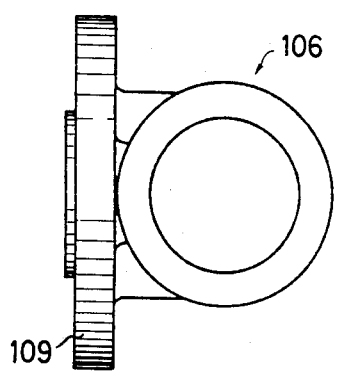
Figure 24:
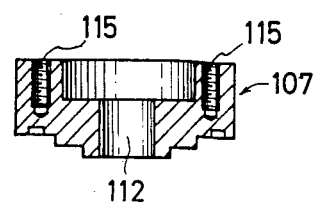

Next, the detailed construction of the front arm 5 will be explained with reference to FIGS. 17 and 18. The front arm 5 consists of a casting of a unitary structure as a whole and includes side surfaces 97, 98 that extend in the longitudinal direction in parallel with each other, an upper surface 99 and crossing reinforcing members 100, 101. A bearing hole 102 for pitching of the wrist is formed at the tip of each side surface 97, 98 of this front arm 5 on the side of the wrist and bearing holes 103, 104 for elevation of the upper arm are formed at the tips of the side surfaces on the side of the upper arm.

Figure 25:
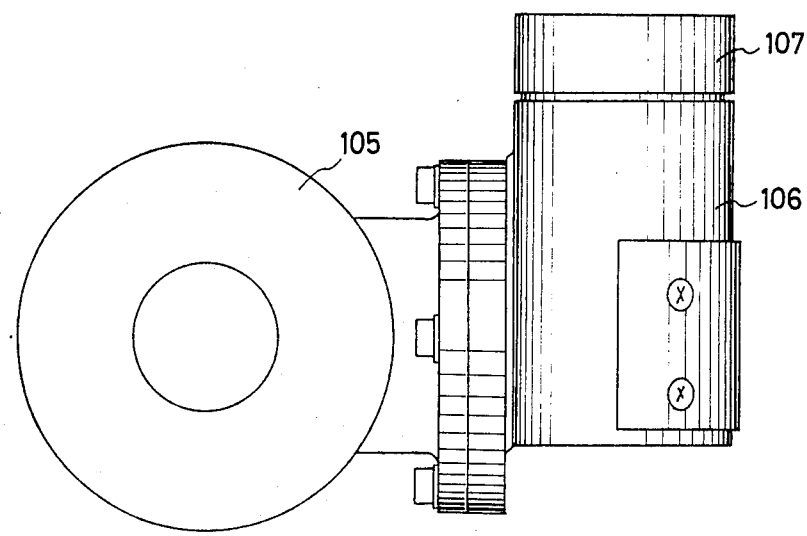
FIG. 25 is a side view of the wrist forming members shown in FIGS. 19 through 24 when they are assembled.

The wrist 6 is pivotally supported with two freedoms by this front arm 5. The detailed construction of the wrist 6 will be described with reference to FIGS. 19 through 25. The wrist 6 consists of three portions, i.e., a first wrist portion 105 accomplishing the pitching motion of the wrist 6 around the P axis, a second wrist portion 106 fixed to this first wrist portion 105 and a third wrist portion 107 supported rotatably with respect to the second wrist portion 106 and accomplishing the yawing motion of the wrist around the $Y_2$ axis. Each of the three portions is made of a casting having a unitary structure and incorporates thereinside a hollow portion 110, 111, 112. The first wrist portion 105 has a front arm bearing hole 102' that corresponds to the bearing hole 102 for the pitching of the wrist on the front arm 5, and a fitting disc 108 for fitting the second wrist portion. The second wrist portion 106 has a fitting disc 109 corresponding to the fitting disc 108 of the first wrist portion 105 and the hollow portions 111 formed thereinside cross one another. At least one through-hole 113 is formed substantially at the center of the second wrist portion. This through-hole is defined in order to inspect the inside or to be used when assembling power transmission gears and the like. A cover having a U-shaped cross-section (not shown) is fitted into a step portion 114 in order to cover this through-hole. The third wrist portion 107 is fitted in a direction crossing at right angles the fitting direction of the first wrist portion 105 with respect to the second wrist portion 106. A suitable number of tool fitting holes 115, . . . , 115 are bored on the upper surface of this third wrist portion so as to fit work tools and the like. When these three wrist portions 105, 106, 107 are combined with one another, the wrist 6 is constituted as depicted in FIG. 25.

Figure 26:
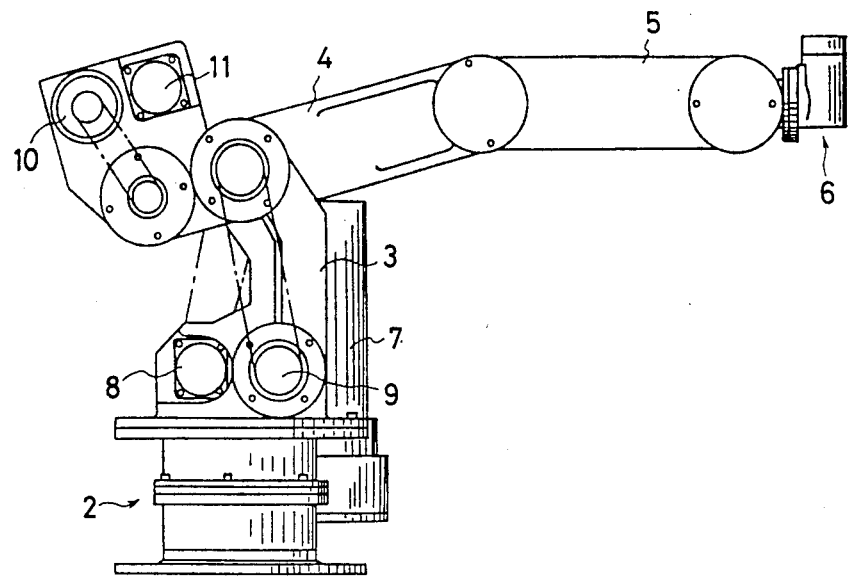
FIGS. 26 and 27 are assembly views of the main body forming members of the portable joint type robot of the present invention when they are assembled.
Figure 27:
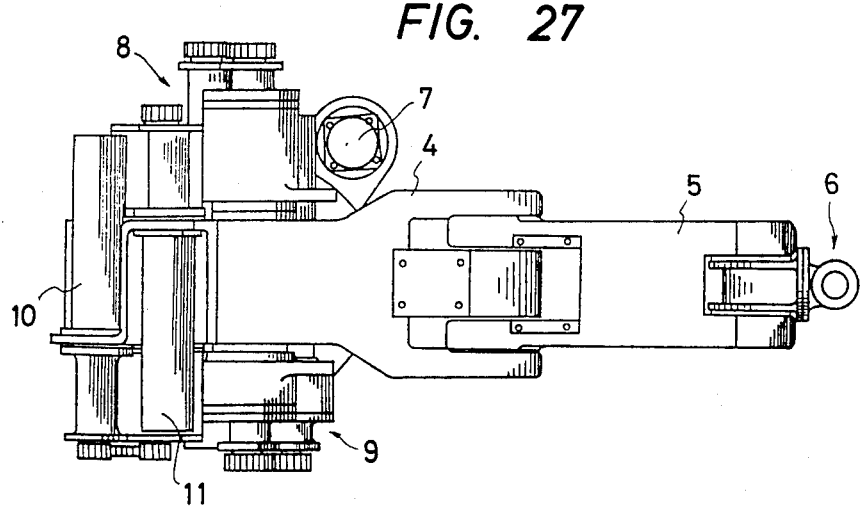

The main body constituents of the main body when they are assembled are clearly illustrated in FIGS. 26 and 27.

Figure 28:
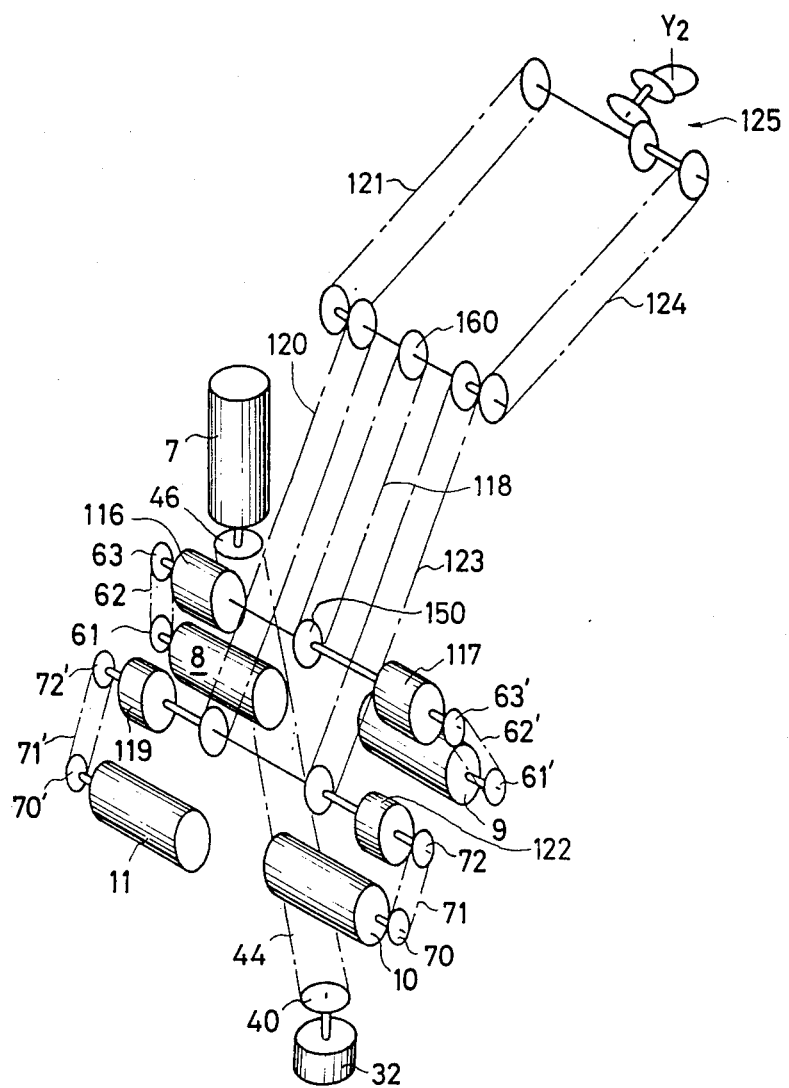
FIG. 28 is a system diagram showing schematically the power transmission of the portable joint type robot of the present invention.

Next, the driving power transmission mechanism of the portable joint type robot in accordance with the present invention will be described in detail. First, the joint type robot of the present invention has five freedoms, that is, one freedom of the rotation of the swivel base 2 as a drum, two freedoms of the elevating motion of the arm mechanism 20 and two freedoms of the yawing and pitching motions of the wrist mechanism 6. This 5-freedom driving power transmission mechanism will be described with reference to FIG. 28. Incidentally, the relation of position of the driving motors is somewhat different from that of the actual apparatus in order to clarify the illustration. Furthermore, the shaft portions which transmit the power are represented by thick shafts while the shaft portions which only support the rotary motion but does not transmit the power are represented by single lines.

Hereinafter, the power transmission mechanism for each freedom will be itemized.

(i) Rotary motion of swivel base 2

Since the force of rotation of the motor 7 is transmitted by the conduction belt 44 through suitable reduction gear means such as the harmonic drive mechanism 32 or the like, the swivel base 2, the motor base 3 fitted onto the former and the arm mechanism 20 are rotated around the vertical first axis of rotation $Y_1$.

(ii) Elevating motion of upper arm 4

Figure 29:
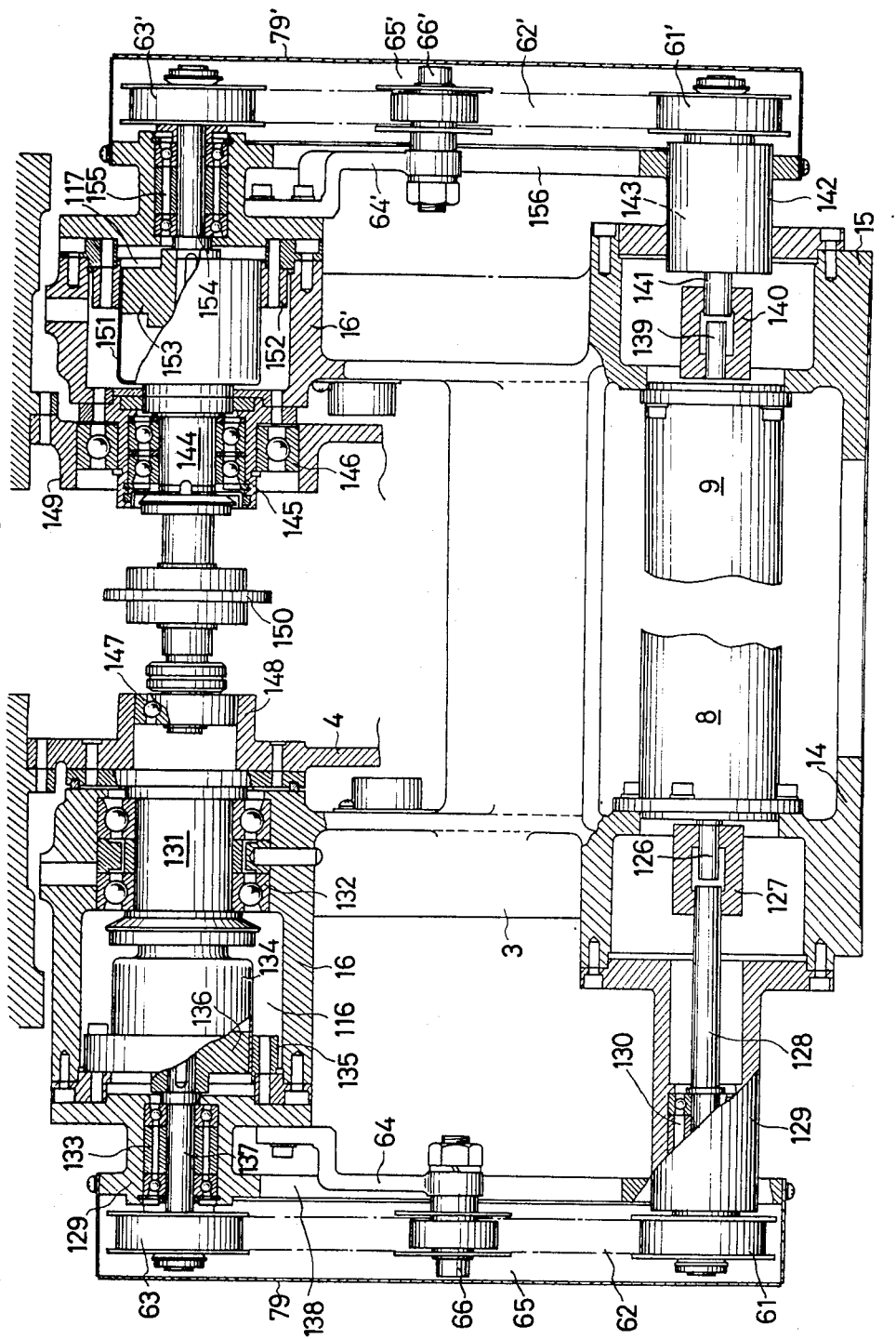

The transmission mechanism of the elevating motion of the upper arm 4 is illustrated in detail in FIG. 29. Since the force of rotation of the upper arm driving motor 8 is transmitted by the conduction belt 62 through suitable reduction gear means such as the harmonic drive mechanism 116 or the like, the upper arm 4 is directly caused to elevate around the horizontal first axis of rotation $X_1$. Incidentally, this driving force is not transmitted to the later-appearing conduction chain 118.

(iii) Elevating motion of front arm 5

The transmission mechanism for the elevating motion of the front arm 5 is illustrated in detail in FIG. 29. The force of rotation of the front arm driving motor 9 is transmitted by the conduction belt 62' through suitable reduction gear means such as the harmonic drive mechanism 117 to directly let the front arm 5 elevate around the horizontal second axis of rotation $X_2$. Incidentally, this driving force is not transmitted to the later-appearing conduction chains 120, 121, 123, 124.

(iv) Pitching motion of wrist 6 around P axis

Figure 30:
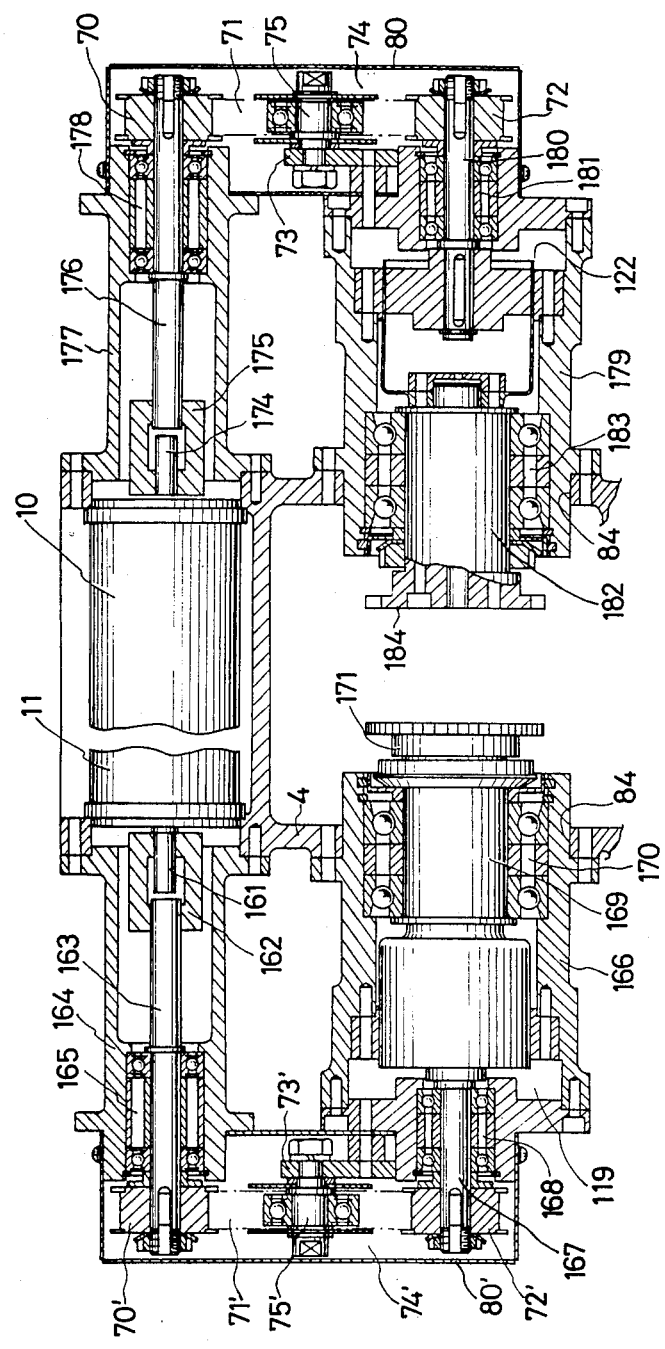
Figure 33:
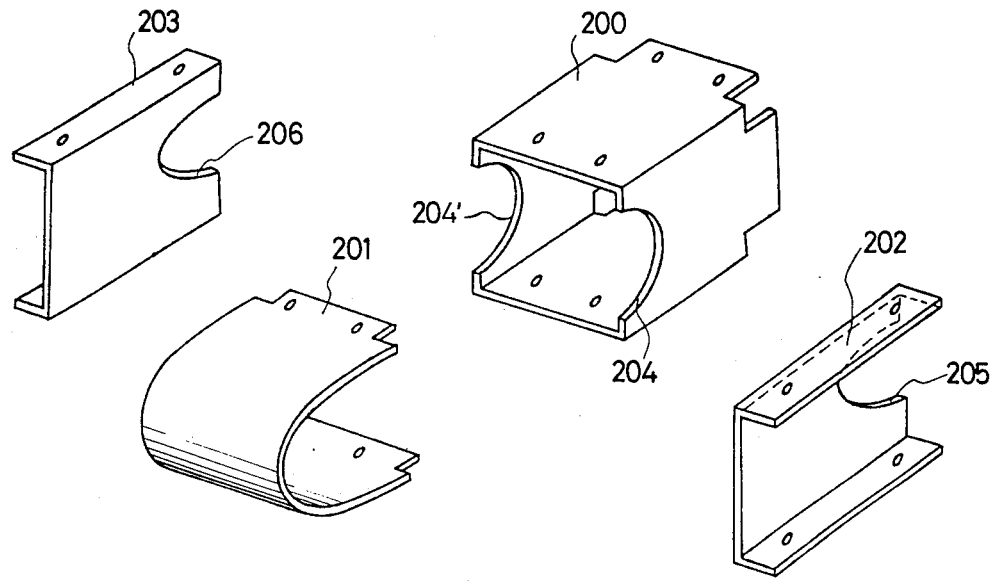
FIG. 33 is a perspective view of a cover fitted to the pivot connecting portion of the upper and front arms of the portable joint type robot of the present invention.

The transmission mechanism for the pitching motion of the wrist 6 around the P axis is illustrated in detail in FIG. 30. The force of rotation of the wrist driving motor 11 is transmitted from the conduction belt 71' by the conduction chain 120 to 121 through suitable reduction gear means such as the harmonic drive mechanism 119 or the like and lets the wrist 6 pitch around the P axis. Incidentally, this driving force is not transmitted to the later-appearing conduction chain 124 or to the yawing motion mechanism of the wrist 6 around the $Y_2$ axis.

(v) Yawing motion of wrist 6 around $Y_2$ axis

The transmission mechanism for the yawing motion of the wrist 6 around the $Y_2$ axis is illustrated in detail in FIG. 30. The force of rotation of the wrist driving motor 10 is transmitted from the conduction belt 71 to the conduction chain 123 and from thence ot 124 through suitable reduction gear means such as the harmonic drive mechanism 122 or the like, and the gear mechanism 125 lets the wrist 6 yawn around the $Y_2$ axis.

Hereinafter, these driving force transmission mechanisms will be explained in further detail with reference to FIGS. 29 through 32.

(i) Rotary motion transmission mechanism of swivel base 2

Figure 4:
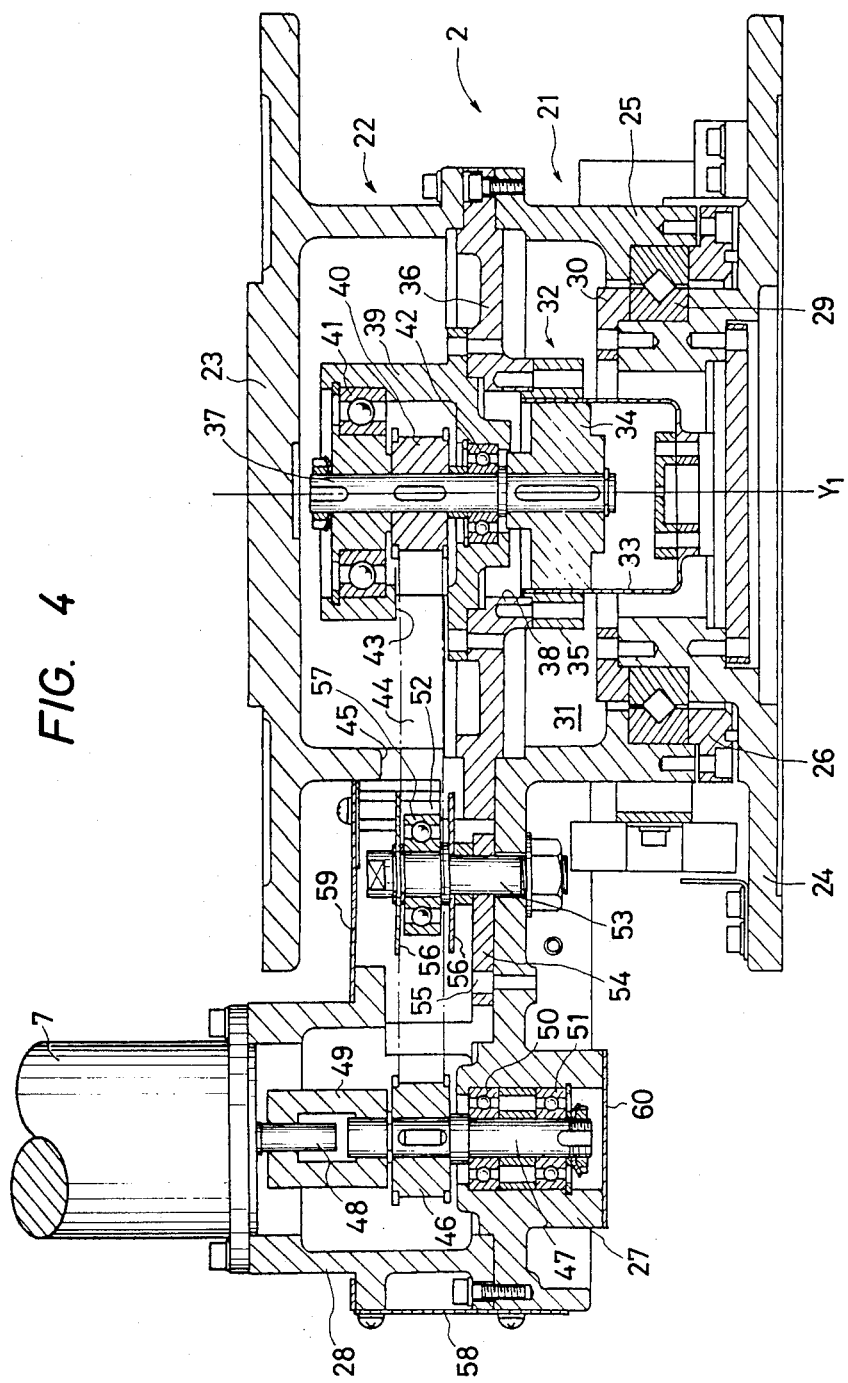
FIG. 4 shows the swivel base and its rotating motion transmission mechanism of the portable joint type robot in accordance with the present invention and is a detailed sectional view taken along line IV—IV of FIG. 5.

The detail of the rotary motion transmission mechanism of the swivel base 2 is illustrated in FIG. 4. Since this mechanism has been described already, re-explanation is omitted.

(ii) Elevating motion transmission mechanism of upper arm 4

The upper arm driving motor 8 is fitted to the fitting boss 14 for the upper arm driving motor of the motor base 3, and a correction output shaft 128 is concentrically connected to the output shaft 126 of the motor via coupling 127. The driving wheel 61 is fixed to the tip of the output shaft 128 by the key 61. This correction output shaft 128 has a suitable length so that, since the harmonic drive mechanism 116 is disposed on the side of the follower shaft, the length on the driving shaft side and that on the follower shaft side can be brought into conformity with each other. The correction output shaft 128 is turnably supported within a first distance correction member 129 by a bearing 130. On the other hand, the upper arm 4 is turnably supported inside the upper arm support boss 16 of the motor base 3 by a bearing 132 via an upper arm first support shaft 131. A flexible cylindrical reduction gear member 134 of the harmonic drive mechanism 116 is fixed to the upper arm support shaft 131 on the opposite side to the fixing side of the upper arm. A follower ring-like member 135 is fixed to the upper arm support boss 16 of the motor base 3 around the outer circumferential edge at the tip of the cylindrical reduction gear member 134 by fixing means such as bolts, and an oval driving member 136 is key-fixed to the follower shaft 137 on the inner circumferential surface of the cylindrical reduction gear member 134. This follower shaft 137 is pivotally supported inside the first distance correction member 129 by a bearing 133 and the follower wheel 63 is key-fixed to the other end portion of this follower shaft 137. A through-hole 138 (whose shape is not shown) having a suitable shape is formed at the center of the first distance correction member, and a T-shaped support plate 64 (see FIG. 7) is fitted into the through-hole 138 by bolt means 67, 68. The tension wheel 65 is turnably supported at the tip of the T-shaped support plate 64 by the bolt 66 so as to elevate the arm 4.

(iii) Elevating motion transmission mechanism of front arm 5

The front arm driving motor 9 is fitted to the front arm driving motor fitting boss 15 of the motor base 3 and the correction output shaft 141 is concentrically connected to its output shaft 139 by the coupling 140. The driving wheel 61' is fixed by the key to the tip of the output shaft 141. The correction output shaft 141 has a suitable length so that since the harmonic drive mechanism 117 is disposed on the side of the follower shaft, the length on the side of the driving shaft and the length on the side of the follower shaft can conform with each other. This correction output shaft 141 is turnably supported inside the second distance correction member 142 by the bearing 143. The upper arm 4 is turnably supported inside the upper arm support boss 16' via an upper arm second support shaft 144 by bearings 145, 146. This upper arm second support shaft 144 is disposed concentrically with the upper arm first support shaft 131 and these first and second upper arm support shafts 131, 144 pivotally support the upper arm 4 so that it can elevate with respect to the motor base 3. The upper arm second support shaft 144 is turnably supported inside support shaft fitting bosses 148, 149 formed on the upper arm 4 by bearings 146, 147 lest the rotary motion of the upper arm first support shaft 131 and that of the upper arm 4 are transmitted thereto. A sprocket 150 is fixed by a key at the position close to the center of the upper arm second support shaft 144 and the flexible cylindrical reduction gear member 151 of the harmonic drive mechanism is fixed to the upper arm support boss 16' of the motor base 3 by fixing means such as bolts to the tip (on the right side) of the upper arm second support shaft 144. An oval driving member 153 is fixed by a key to the follower shaft 154 on the inner circumferential surface of the cylindrical reduction gear member 151. The follower shaft 154 is pivotally supported inside the second distance correction member 142 by a bearing 154 and the follower wheel 63' is fixed by a key to the other end portion of this follower shaft 154. A through-hole 156 (whose shape is not shown) having a suitable shape is bored at the portion of this second distance correction member 142 close to its center, and the T-shaped support plate 64' (see FIG. 7) is fitted into this through-hole by bolt means 67', 68'. The tension wheel 65' is turnably supported at the tip of the T-shaped support plate 64' by bolts 66' and applies suitable tension to the conduction belt 62' spread between the driving wheel 61' and the follower wheel 63'. This tension wheel 65' has the same construction as that of the tension wheel 52' (see FIG. 4) described earlier.

The chain 118 that is wound on the sprocket 150 extends up to the front arm bearing portion inside the upper arm 4 and is wound on a sprocket 160 that is key-fixed to the front arm follower shaft 159 supported turnably by bearings 157, 158 inside the front arm bearing hole 85 of the upper arm 4. This follower shaft 159 is key-fixed to the bearing 158.

Due to the construction described above, the force of rotation of the front arm driving motor 9 is transmitted to the front arm 5 to elevate it through the correction output shaft 141, the driving wheel 61', the conduction belt 62', the follower wheel 63', the follower shaft 154, the harmonic drive mechanism 117, the upper arm second support shaft 144, the sprocket 150, the chain 118 and the sprocket 160.

(iv) Pitching motion transmission mechanism of wrist 6 around P axis

The wrist driving motor 11 is fitted to the front half of the L-shaped upper arm 4 at the tip of the upright base portion 82. The correction output shaft 163 is concentrically connected to the output shaft of this driving motor 11 by a coupling 162 and the driving wheel 70' is key-fixed to the tip of the correction output shaft 163. The correction output shaft 163 has a suitable length so that since the harmonic drive mechanism 119 is disposed on the follower shaft side, the length on the driving side and that of the follower shaft side conform with each other. This correction output shaft 163 is turnably supported by a bearing 165 inside the third distance correction member 164. A first housing 166 for the wrist follower shaft is fitted into a bearing hole 84 that is bored at the point of intersection between the horizontal extension portion 81 and upright base portion 82 of the upper arm 4. The harmonic drive mechanism 119 is disposed inside the first housing 166. The detail of this harmonic drive mechanism is omitted because it has the same construction as that of the harmonic drive mechanism 116 or 117 described already.

The follower shaft 167 on the input side of this harmonic drive mechanism 119 is turnably supported by a bearing 168 and the follower wheel 72' is fixed by a key. An L-shaped support plate 63' is fitted at a suitable position of the first housing 166 by bolt means and the tension wheel 74' is turnably supported by a bolt 75' at the bent portion of the L-shaped support plate 63', and applies suitable tension to the conduction belt 71' that is stretched between the driving wheel 70' and the follower wheel 72'. The output shaft 169 of the harmonic drive mechanism 119 is turnably supported by a bearing 170 inside the first housing 166 and a sprocket 171 is key-fixed to the tip on the opposite side. The conduction chain 120 is wound on the sprocket 171, extends in the longitudinal direction inside the upper arm 4 beyond the second support shaft 144 and is wound on one of first two-throw sprocket 172. A chain 121 is wound on the other of the first two-throw sprocket 172, extends in the longitudinal direction inside the front arm 5 and is wound on a sprocket 173 that is supported inside wrist pitching bearing hole 102. This sprocket 173 is fixed by a bolt to the first wrist portion 105 of the wrist 6.

The construction described above transmits the force of rotation of the wrist driving motor 11 to the wrist 6 via the correction output shaft 163, the driving wheel 70', the conduction belt 71', the follower wheel 72', the follower shaft 167, the harmonic drive mechanism 119, the output shaft 169, the sprocket 171, the conduction chain 120, the first double-throw sprocket 172, the conduction chain 121 and the sprocket 173, thereby causing the pitching motion of the wrist 6. This pitching motion is not transmitted to the elevating motion mechanism of the wrist 6 around the $Y_2$ axis.

(v) Yawing motion transmission mechanism of wrist 6 around $Y_2$ axis

The wrist driving motor 10 is fitted to the latter half at the tip of the upright base portion of the L-shaped upper arm 4. A correction output shaft 176 is concentrically connected to the output shaft 174 of this driving motor 10 by a coupling 175 and the driving wheel 70 is key-fixed to the tip of the correction output shaft 176. The correction output shaft has a suitable length so that since the harmonic drive mechanism 122 is disposed on the follower shaft side, the length on the driving shaft side and the length on the follower shaft side conform with each other. The correction output shaft 176 is turnably supported inside a fourth distance correction member 177 by a bearing 178. A bearing hole 84 is bored at the point of intersection between the horizontal extension portion 81 and upright base portion of the upper arm 4 and a second housing 171 of the wrist follower shaft is fitted into this bearing hole. The harmonic drive mechanism 122 is disposed inside this second housing 179. The detail of this harmonic drive mechanism will not be explained once again because it has the same construction as the harmonic drive mechanism 116 or 117 described already. The follower shaft 180 of this harmonic drive mechanism 122 on the input side is turnably supported by a bearing 181 and the follower wheel 72 is key-fixed thereto. An L-shaped support plate 63 is fitted by bolt means to a suitable position of the second housing 179 and the tension wheel 74 is turnably supported by the bolt 75 at the bent portion of the L-shaped support plate 63, thereby applying suitable tension to the conduction belt 71 spread between the driving wheel 70 and the follower wheel 72.

The shaft 182 of the harmonic drive mechanism 122 on the output side is turnably supported by a bearing 183 inside the second housing 179 and a sprocket 184 is key-fixed to the tip of the shaft 182 on the opposite side. A conduction belt 123 is wound on this sprocket 184, extends in the longitudinal direction inside the upper arm 4 beyond the upper arm second support shaft 144 and is wound on one of the sprockets of a second double-throw sprocket 185 turnably supported on a front arm follower shaft 159 that is supported inside the bearing hole 85 for the front arm elevation. A chain 124 is wound on the other of this double-throw sprocket, extends in the longitudinal direction inside the front arm 5 and is wound on a sprocket 186 supported inside the bearing hole 102 for wrist pitching. The sprocket 186 is key-fixed to a wrist pitching shaft 187 and a first bevel gear 188 is also key-fixed thereto.

An intermediate conduction shaft 189 is turnably supported by bearings 191, 191 inside the hollow portion of the first wrist portion 105 in a direction crossing at right angles the wrist pitching shaft 187 and a second bevel gear 192 is key-fixed at one of its ends. This second bevel gear engages with the first bevel gear 188. A third bevel gear 193 is key-fixed at the other end of the intermediate conduction shaft 189. Furthermore, a yawing shaft 194 is turnably supported by beaings 195, 196 inside the hollow portion of the second wrist portion 106 in a direction crossing at right angles the intermediate conduction shaft 189 and a fourth bevel gear 197 is key-fixed to one of the ends of this yawing shaft 194. The fourth bevel gear engages with the third bevel gear 193. The third wrist portion 107 is key-fixed to the opposite side of the yawing shaft 194.

According to the construction described above, the force of rotation of the wrist driving motor 10 is transmitted to the third wrist portion 197 and causes its yawing motion around the $Y_2$ axis through the correction output shaft 176, the driving wheel 70, the conduction belt 71, the follower wheel 72, the follower shaft 180, the harmonic drive mechanism 122, the shaft 182 on the output side, the sprocket 184, the conduction chain 123, the second double-throw sprocket 185, the conduction chain 124, the sprocket 186, the wrist pitching shaft 187, the first and second bevel gears 188, 192, the intermediate conduction shaft 189, the third and fourth bevel gears 193, 197 and the yawing shaft 194.

The robot in accordance with the present invention is compact and portable. Especially when used for welding, therefore, the robot must operate under severe working environment close to the welding work positions. Accordingly, there is a high necessity that the dust or the like must be prevented from entering the power transmission mechanism of the robot. For this reason, the robot of the present invention is equipped with various covers. Particularly because the cover for the pivot connecting portion between the upper and front arms 4 and 5 has a specific shape, it will be explained with reference to FIGS. 32-a, 32-b and 33.

First, a cover 200 having a square cylinder is fitted to the tip of the upper arm 4 by screws or the like and a U-shaped cover 201 is fitted to the tip of the cover 200. On the other hand, a pair of ]-shaped flat sheet covers 202, 203 are fitted to the front arm 5 from inside the side surface by screws or the like. Semi-spherical notches 204, 204', 205 and 206 are defined on the square cylindrical cover 200 and flat sheet covers 202, 203 so that the front arm elevation shaft portion passes through them.

Figure 34:
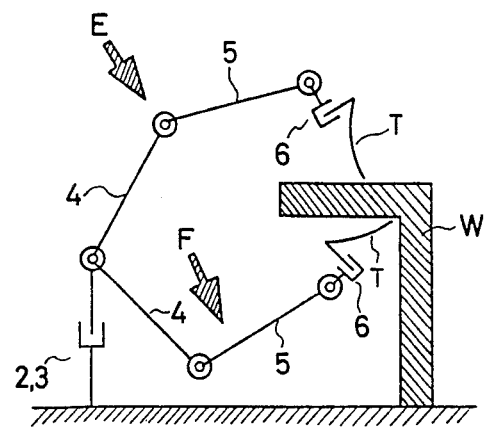
FIG. 34 is a schematic view showing the posture of the robot of the present invention when used for the practical work.
Figure 36:
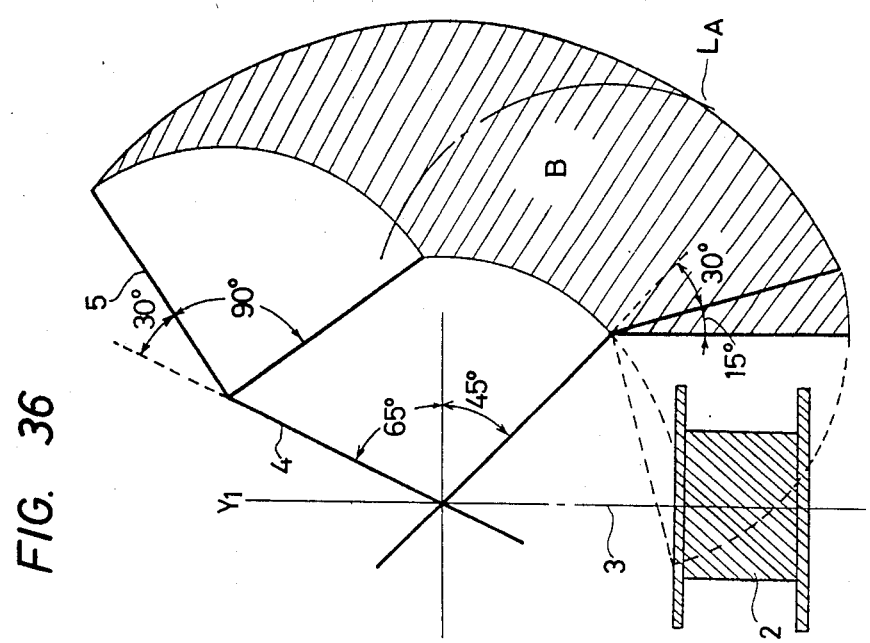
FIGS. 35 and 36 are detailed views of the postures shown in FIG. 34.
Figure 35:
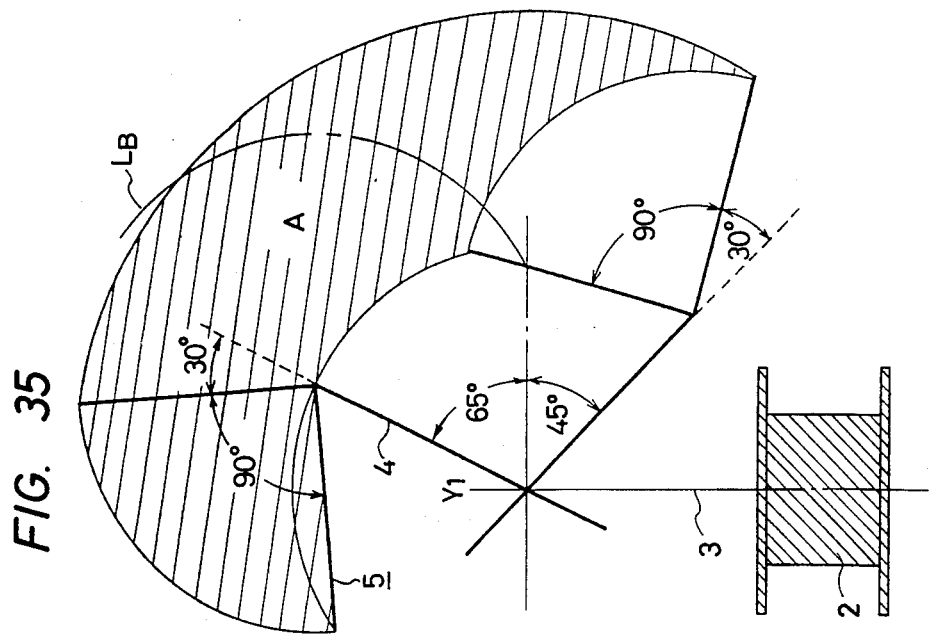
Figure 37:
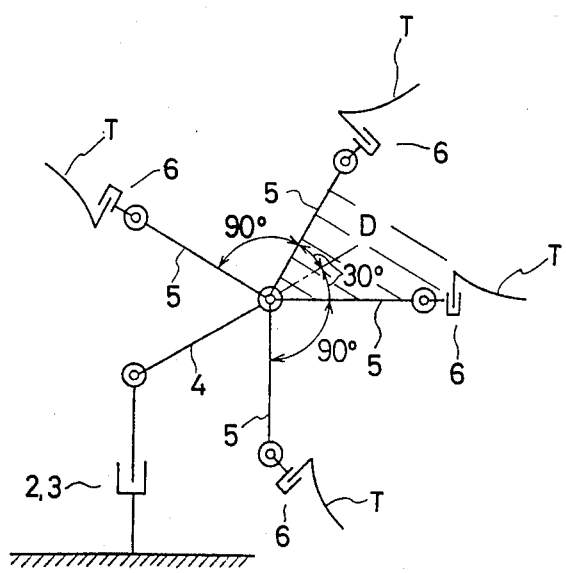
FIG. 37 is a schematic view useful for explaining the dead operation region of the robot of the present invention.

Next, the portable joint type robot using the driving device of the present invention will be described with reference to the case where a hook-shaped work is welded. It will be now assumed that the hook-shaped work W is welded from the vertical direction as shown in FIG. 34. In this case, the upper arm 4, front arm 5 and wrist 6 of the robot must assume the downward posture represented by an arrow E and the upward posture represented by an arrow F. Symbol T in the drawing represents a torch. Selection of these postures must be carefully made particularly when the hook-shaped work W shown in the drawing is welded or screwed. In other words, when the robot changes from one posture to another, there is the possibility that the arms and the wrist collide against the work. It is therefore preferred to secure independent work regions for each posture. As shown in FIGS. 35 and 36, the work regions are set so that the robot operates only within the work region A in the downward posture E while the robot operates only within the work region B in the upward posture F. Particular operation instruction is given when the work region for each posture is independently secured and the robot must be operated over each work region.

In FIGS. 35 and 36, curves LA and LB represented by dot-and-chain line indicate the upper and lower limit work boundary lines in the work regions A and B, respectively. When the robot is moved to the work region where the work regions A and B overlap, the problem occurs in which work region the robot exits. This problem can be determined by the work posture of the robot at present or at a point a little before. If the robot has taken the downward arm posture a little before, the indicated point is determined as being the point within the work region A and if the robot has taken the upward arm posture a little before, the indicated point is determined as the point within the region B. In this manner, the problem of existence of two solutions for the posture to be taken by the robot arm mechanism can be prevented.

Furthermore, a dead work region D is secured within $\pm 30°$ close to the boundary of the upward arm posture and the downward arm posture and this dead work region D is not the work region of the robot. This is because the motor power necessary for accelerating the robot in the arm direction becomes closer to the infinite as the angle between the upper and front arms 4 and 5 becomes closer to 0°, whereby acceleration is not possible in practice. This also necessitates the arrangement in which the work regions of the robot are separately secured for the upward arm posture and the downward arm posture.

As described above, the main body construction of the portable joint type robot and the driving power transmission mechanism of the present invention have the extremely compact construction and their operation control can be freely accomplished by suitably controlling the rotation of the driving motors 7, 8, 9, 10 and 11.

What is claimed is:
1. A joint type robot comprising:
a fixed base,
a swivel base mounted for rotation on said fixed base about a vertical axis,
a motor base fixed on said swivel base for rotation with said swivel base, said motor base having a first pair of parallel, overlapped and oppositely directed motor receiving recesses therein, an arm mechanism mounted on said motor base, said arm mechanism having an upper arm attached to said motor base for rotation about a first horizontal axis and further having a rearwardly extending portion extending rearwardly of said first horizontal axis and a front arm mounted on said upper arm for rotation about a second horizontal axis, said rearwardly extending portion having a second pair of parallel, overlapped and oppositely directed motor receiving recesses thereon, a wrist having at least two degrees of freedom mounted on said front arm opposite said second horizontal axis of rotation, a first pair of driving motors, each said driving motor having an output shaft and an axis of output shaft rotation, mounted in said first pair of recesses with said axes of output shaft rotation parallel and said output shaft ends directed in 180 degree opposite directions with respect to each other such that said first motors are overlapped on said motor base to provide a more compact structure, one of the said first pair of driving motors driving said upper arm and the other driving said front arm, a second pair of driving motors, each said driving motor having an output shaft and an axis of output shaft rotation, mounted in said second pair of recesses on said rearwardly extending portion of said upper arm with said axes of output shaft rotation parallel and said output shaft ends directed in 180 degree opposite directions with respect to each other such that said second motors are overlapped on said arm to provide a more compact structure, one of said second pair driving motors driving one of said at least two degrees of freedom of said wrist, the other of said second driving motors driving another of said at least two degrees of freedom of said wrist, and a driving motor having a vertical axis of rotation mounted on said swivel base outside said motor base and out of the range of motion of said arm mechanism for driving said swivel base about said fixed base.

2. A joint type robot according to claim 1, wherein said motor base includes a pair of upright opposed side walls fixed on said swivel base and a reinforcing member connecting said side walls, a boss on each of said side walls for receiving the output shaft end of one of said first pair of driving motors, a U-shaped notch on each of said side walls for receiving the opposite end of the other of said first pair of driving motors, said U-shaped notch on one side wall aligned with the boss on the other side wall when said side walls are fixed on said swivel base whereby said first pair of driving devices is fixed between said walls with their shaft output axes parallel and their output shaft ends directed in 180 degree opposite direction with respect to each other, and, further, wherein said upper arm has a step shaped fitting plate fixed to said rearwardly extending portion of said upper arm, said step shaped plate including two parallel side portions offset with respect to each other in the longitudinal direction of said upper arm, and a crossing plate connecting said side plates to form a step shaped fitting, each of said side portions having a fitting hole for fitting each of said pair of second driving motors, whereby said driving devices are fixed to said step shaped fitting plates such that said axes of output shaft rotation are parallel and said output shaft ends are directed in 180 degree opposite directions with respect to each other.

3. A joint type robot according to claim 2 wherein said swivel base, said motor base, said upper arm, and said front arm are each a unitary casting.

4. A joint type robot including a swivel base, a motor base fixed on said swivel base, and an arm mechanism including a wrist mounted on said motor base, said swivel base comprising;
a first base,
an intermediate disc, and
a second base,
said first base including a fixed base and a rotary base mounted on said fixed base for rotation about a vertical first axis, said rotary base of said first base supporting a driving motor having a vertical second axis of rotation, said driving motor mounted at the periphery of said swivel base, said motor lying outside said motor base and outside the range of motion of said arm mechanism, said intermediate disc fixed to said rotary base and holding a driven shaft connected to said fixed base through a harmonic drive, said second base fixed with respect to said rotary base of said first base and said intermediate disc and having a bed for receiving a motor base, said driving motor connected to said driven shaft by a conduction belt to transmit the force of rotation from said driving motor to said driven shaft whereby said swivel base is rotated, said harmonic drive and said driven shaft housed in a hollow portion of said swivel base, said arm mechanism mounted on said motor base for rotation about a horizontal axis, said arm mechanism having an upper arm mounted on said motor base and a front arm mounted on said upper arm, said upper arm having a rearwardly extending portion extending rearwardly of said horizontal axis, said rearwardly extending portion having mounted thereon at least one driving motor to balance said arm mechanism about said horizontal axis, said motor base including a pair of upright sidewalls supporting said arm mechanism fixed on said swivel base, a reinforcing member connecting said sidewalls, said reinforcing members and said sidewalls forming a notch to receive said rearwardly extending portion of said upper arm as said upper arm mechanism is elevated about said horizontal axis.

5. A joint type robot according to claim 4, wherein said harmonic drive means includes, an oval driving member mounted for rotation in said intermediate disc, a driven ring member fixed to said intermediate disc, and a flexible cylindrical reduction gear fixed to said fixed base to be interposed between said driven ring member and said oval driving member, said oval driving member connected to and driven by a follower wheel connected to said driving device by said conduction belt to transmit the force of rotation of said driving device, said flexible cylindrical gear engaging said driven ring member by the rotation of said oval driving member to transmit the force of rotation from said oval driving member to said driven ring member at a reduced rate, whereby said intermediate disc is driven at a reduced rate.

* * * * *